(12) United States Patent
Sun et al.

(10) Patent No.: US 10,693,543 B2
(45) Date of Patent: Jun. 23, 2020

(54) BEAMFORMING-BASED TRANSMISSION METHOD AND APPARATUS

(71) Applicant: Huawei Technologies Co., Ltd., Shenzhen (CN)

(72) Inventors: Yanliang Sun, Shenzhen (CN); Bin Liu, San Diego, CA (US)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/338,641

(22) PCT Filed: Sep. 30, 2016

(86) PCT No.: PCT/CN2016/101288
§ 371 (c)(1),
(2) Date: Apr. 1, 2019

(87) PCT Pub. No.: WO2018/058621
PCT Pub. Date: Apr. 5, 2018

(65) Prior Publication Data
US 2019/0356367 A1 Nov. 21, 2019

(51) Int. Cl.
*H04B 7/06* (2006.01)
*H04B 7/0456* (2017.01)
*H04W 72/04* (2009.01)

(52) U.S. Cl.
CPC ......... *H04B 7/0617* (2013.01); *H04B 7/0469* (2013.01); *H04B 7/0632* (2013.01); *H04B 7/0634* (2013.01); *H04W 72/0406* (2013.01)

(58) Field of Classification Search
CPC .. H04B 7/0617; H04B 7/0469; H04B 7/0632; H04B 7/0634; H04B 7/0456; H04B 7/0452; H04W 72/0406; H04W 16/28
See application file for complete search history.

(56) References Cited

U.S. PATENT DOCUMENTS

2005/0286663 A1* 12/2005 Poon .................... H04B 7/0417
375/347
2008/0165875 A1* 7/2008 Mundarath .......... H04B 7/0417
375/262

(Continued)

FOREIGN PATENT DOCUMENTS

CN 101895486 A 11/2010
CN 103326761 A 9/2013

(Continued)

OTHER PUBLICATIONS

Nokia, et al., "DMRS-based Semi-open Transmission Schemes," R1-166344, 3GPP TSG RAN WG1 Meeting #86, Gothenburg, Sweden, 5 pages.

(Continued)

*Primary Examiner* — Janice N Tieu
(74) *Attorney, Agent, or Firm* — Conley Rose, P.C.

(57) ABSTRACT

A method includes obtaining, by a terminal, a quantity M of beamforming vectors needing to be reported by the terminal and a first reference signal that are sent by a base station; estimating downlink channel states on N dual-polarized antenna ports based on the first reference signal; selecting m first beamforming codewords based on the downlink channel states and the quantity M of beamforming vectors needing to be reported that is sent by the base station; and feeding back the m selected first beamforming codewords and ranks of the downlink channel states to the base station.

19 Claims, 11 Drawing Sheets

(56) References Cited

U.S. PATENT DOCUMENTS

| | | | | |
|---|---|---|---|---|
| 2008/0225960 A1* | 9/2008 | Kotecha | .............. | H04B 7/0413 375/259 |
| 2009/0141824 A1* | 6/2009 | Xia | ..................... | H04B 7/0417 375/267 |
| 2009/0253380 A1* | 10/2009 | Ko | ......................... | H04B 7/043 455/68 |
| 2010/0239037 A1* | 9/2010 | Tang | ................... | H04B 7/0639 375/260 |
| 2015/0222340 A1 | 8/2015 | Nagata et al. | | |
| 2016/0191273 A1 | 6/2016 | Nagata et al. | | |
| 2016/0233938 A1 | 8/2016 | Mondal et al. | | |
| 2017/0244459 A1 | 8/2017 | Chen et al. | | |

FOREIGN PATENT DOCUMENTS

| | | |
|---|---|---|
| CN | 103475401 A | 12/2013 |
| CN | 104604277 A | 5/2015 |
| CN | 105207738 A | 12/2015 |
| CN | 105322992 A | 2/2016 |
| CN | 105530037 A | 4/2016 |
| WO | 2015115706 A1 | 8/2015 |
| WO | 2016051792 A1 | 4/2016 |

OTHER PUBLICATIONS

Foreign Communication From a Counterpart Application, European Application No. 16917371.3, Extended European Search Report dated Jul. 12, 2019, 13 pages.

Machine Translation and Abstract of Chinese Publication No. CN101895486, Nov. 24, 2010, 19 pages.

Machine Translation and Abstract of Chinese Publication No. CN105207738, Dec. 30, 2015, 14 pages.

Machine Translation and Abstract of Chinese Publication No. CN105322992, Feb. 10, 2016, 24 pages.

"3rd Generation Partnership Project; Technical Specification Group Radio Access Network; Study on 3D channel model for LTE (Release 12)," 3GPP TR 36.873, V12.2.0, Jun. 2015, 42 pages.

CATT, "Discussion on DMRS based semi-open-loop MIMO," R1-164225, 3GPP TSG RAN WG1 Meeting #85, Nanjing, China, May 23-27, 2016, 5 pages.

Qualcomm Incorporated, "Discussion on DMRS based OL and Semi-OL Transmission," R1-164433, 3GPP TSG-RAN WG1 #85, Nanjing, China, May 23-27, 2016, 5 pages.

Ericsson, "DMRS-based Open-loop MIMO," R1-165407, 3GPP TSG-RAN WG1#85, Nanjing, China, May 23-27, 2016, 5 pages.

Nokia, et al., "Evaluation Results of DMRS-based Open-loop Transmission Schemes," R1-165433, 3GPP TSG RAN WG1 Meeting #85, Nanjing, China, May 23-27, 2016, 4 pages.

Huawei, et al., "Discussion on DMRS based open and semi open loop transmission," R1-164859, 3GPP TSG RAN WG1 Meeting #85, Nanjing, China, May 23-27, 2016, 7 pages.

Foreign Communication From a Counterpart Application, PCT Application No. PCT/CN2016/101288, English Translation of International Search Report dated Jun. 21, 2017, 2 pages.

Foreign Communication From a Counterpart Application, PCT Application No. PCT/CN2016/101288, English Translation of Written Opinion dated Jun. 21, 2017, 3 pages.

* cited by examiner

BEAMFORMING-BASED TRANSMISSION METHOD AND APPARATUS

CROSS-REFERENCE TO RELATED APPLICATIONS

This application is a National State of International Application No. PCT/CN2016/101288, filed on Sep. 30, 2016, which is hereby incorporated by reference in its entirety.

TECHNICAL FIELD

Embodiments of the present invention relate to the field of wireless communications technologies, and in particular, to a beamforming-based transmission method and apparatus.

BACKGROUND

LTE (Long Term Evolution), as a Long Term Evolution standard, enables study and commercialization of a new technology for a land mobile communications network to be carried out smoothly. An FD-MIMO (Full dimensional MIMO, full dimensional Multiple Input Multiple Output) antenna technology is introduced to LTE R13 (Release 13). To be specific, beamforming is performed in both a horizontal dimension and a vertical dimension with the help of a two-dimensional antenna array on a base station end, and corresponding precoding codebook enhancement, feedback procedure enhancement, and the like may be performed accordingly. A cell capacity is significantly improved through the enhancement. However, due to two-dimensional beamforming, when compared with R13 (Release 13), in R13, a precoding codebook is significantly increased, and a feedback procedure is also more complex. Therefore, a precoding feedback period is longer in R13, and an operation can often be performed only in a relatively static environment. For a high-speed movement scenario, to define a similar beamforming-based transmission solution, namely, an open-loop-3D-MIMO solution, has become an important issue to be discussed in LTE Release 14.

In an LTE standard, actually, some transmission modes for an open-loop high-speed movement scenario, for example, a transmission mode 2 (TM2), namely, SFBC (space frequency block coding) transmit diversity transmission and a transmission mode 3 (TM3), namely, LD-CDD (large delay cyclic delay diversity) transmission, have been defined in R8 (Release 8). Because channel estimation depends on a cell-specific reference signal, in the foregoing two transmission modes, transmission of signals of a maximum of only four antennas is allowed, and beamforming cannot be effectively performed to improve a cell capacity.

In the prior art, there is an open-loop-FD-MIMO related solution shown in FIG. 1. Specific steps in the solution are as follows:

Step 101: An eNB (evolved NodeB) sends a first reference signal on N dual-polarized antenna ports, namely, a first antenna group, for a terminal to estimate downlink channel states. Step 102: The terminal estimates the downlink channel states based on the first reference signal, to select a first beamforming codeword from a first codeword set, and calculate a channel quality indicator. Step 103: The eNB determines the first beamforming codeword based on a feedback of the terminal; performs beamforming for an antenna group (N/2 antenna ports) in each polarization direction, and generates two antenna ports, namely, a second antenna port group; and sends a second reference signal on the two antenna ports. Step 104: Perform LD-CDD precoding (a rank (rank)=2) or SFBC (a rank=1) on the two antenna ports, and generate two new ports or one new port, namely, a third antenna port group, for data transmission. Step 105: The terminal estimates downlink channel states on the two ports based on the second reference signal, to decode a data channel based on an inherent LD-CDD or SFBC coding procedure.

It can be learned from the foregoing steps that, in the prior art, beamforming is performed only for the antenna group in each polarization direction, and a beamforming vector is from the first codeword set. When the first codeword set is an R13 codebook, only one beam is generated through beamforming-based on the R13 codebook. Consequently, a spatial multipath characteristic cannot be well used. Even if a linear combination codebook in R14 is used, multipath random phase combination caused because of a fixed combined weight intensifies a channel fading characteristic. This departs from the original purpose of performing beamforming.

SUMMARY

Embodiments of the present invention provide a beamforming-based transmission method and apparatus, so that a terminal can teed back a plurality of beamforming vectors, to fully use a multipath characteristic of a channel, and communication robustness can be maintained in a high-speed movement scenario based on multipath diversity of the channel.

According to a first aspect, a beamforming-based transmission method is provided. The method includes:

obtaining, by a terminal, a quantity M of beamforming vectors needing to be reported by the terminal and a first reference signal that are sent by a base station, where the first reference signal is sent by the base station on N dual-polarized antenna ports, and M and N each are an integer greater than 0;

estimating, by the terminal, downlink channel states on the N dual-polarized antenna ports based on the first reference signal;

selecting, by the terminal, m first beamforming codewords based on the downlink channel states and the quantity M of beamforming vectors needing to be reported that is sent by the base station, where m≤M; and feeding back, by the terminal, the m selected first beamforming codewords and ranks of the downlink channel states to the base station.

The terminal selects the m first beamforming codewords based on the downlink channel states and the quantity M of beamforming vectors needing to be reported that is sent by the base station, and feeds back the m first beamforming codewords to the base station, so that a multipath characteristic of a channel can be fully used, and communication robustness can be maintained in a high-speed movement scenario based on multipath diversity of the channel.

Optionally, the terminal determines the quantity m of the selected first beamforming codewords by using the following step:

determining, by the terminal, the quantity M of beamforming vectors needing to be reported that is sent by the base station, as the quantity m of the selected first beamforming codewords.

Optionally, the terminal determines the quantity m of the selected first beamforming codewords by using the following steps:

determining, by the terminal, the quantity m of the selected first beamforming codewords based on the downlink channel states and the quantity M of beamforming vectors needing to be reported that is sent by the base station, so that channel quality after joint precoding of m optimal beamforming vectors is optimal; and feeding back, by the terminal, a value of m to the base station.

The terminal obtains m based on the downlink channel states, and feeds back m to the base station, so that the channel quality after the joint precoding of the m optimal beamforming vectors can be optimal, to maintain the communication robustness in the high-speed movement scenario.

Optionally, the m first beamforming codewords selected by the terminal are selected from a first codeword set, and the first codeword set is a codebook W1 having a rank of 1 in Long Term Evolution LTE Release 13 or is a set including new codebooks obtained by performing linear weighted summation on some codewords in a codebook W1 having a rank of 1 in LTE Release 13; or the first codeword set is a restricted set sent by the base station, and the restricted set is a set including codewords selected by the base station from a codebook W1 having a rank of 1 in LIE Release 13 or is a set including codewords selected by the base station from a set including new codebooks obtained by performing linear weighted summation on some codewords in a codebook W1 having a rank of 1 in LIE Release 13.

Optionally, the selecting, by the terminal, m first beamforming codewords includes:

estimating, by the terminal, a radiation angle of an antenna of the base station, to determine m beamforming directions with optimal channel quality; and determining, by the terminal, directional angle values of the m beamforming directions with optimal channel quality, where a directional angle value is a directional angle or a trigonometric function value of a directional angle.

Optionally, after the feeding back, by the terminal, the m selected first beamforming codewords and ranks of the downlink channel states to the base station, the method further includes:

calculating, by the terminal, a channel quality indicator based on the selected first beamforming codewords and the ranks of the downlink channel states, and feeding back the channel quality indicator to the base station.

Optionally, after the feeding back, by the terminal, the channel quality indicator to the base station, the method further includes:

obtaining, by the terminal, a second reference signal sent by the base station and data transmitted by the base station, where the data is transmitted by the base station on k antenna ports; and.

estimating, by the terminal, downlink channel states on the k antenna ports based on the second reference signal, and decoding, through preceding, a data channel based on ranks of the downlink channel states, where k is a positive integer greater than 0.

Optionally, after the feeding back, by the terminal, the m selected first beamforming codewords and ranks of the downlink channel states to the base station, the method further includes:

obtaining, by the terminal, a second reference signal sent by the base station, where the second reference signal is sent by the base station on p antenna ports; and estimating, by the terminal, downlink channel states on the p antenna ports based on the second reference signal, selecting q antenna ports from the p antenna ports based on the downlink channel states, calculating a channel quality indicator, and feeding back sequence numbers of the q antenna ports and the calculated channel quality indicator to the base station, where $q \leq p$ and p is equal to m or p is equal to 2 m.

Optionally, after the feeding back, by the terminal, sequence numbers of the q antenna ports and the calculated channel quality indicator to the base station, the method further includes:

obtaining, by the terminal, a third reference signal sent by the base station and data transmitted by the base station, where the data is transmitted by the base station on k antenna ports; and estimating, by the terminal, downlink channel states on the k antenna ports based on the third reference signal, and decoding, through precoding, a data channel based on ranks of the downlink channel states.

Optionally, the decoding, through precoding, a data channel based on ranks of the downlink channel states includes:

when the rank of the downlink channel state is 1, if a quantity of the k antenna ports is an even number, decoding, by the terminal, the data channel through SFBC precoding; otherwise, decoding, by the terminal, the data channel through large delay cyclic diversity precoding; or when the rank of the downlink channel state is greater than 1, decoding, by the terminal, the data channel through open-loop spatial multiplexing precoding; or when the rank of the downlink channel state is 1, decoding, by the terminal, the data channel through large delay cyclic diversity precoding; or when the rank of the downlink channel state is greater than 1, decoding, by the terminal, the data channel through open-loop spatial multiplexing precoding.

According to a second aspect, a beamforming-based transmission method is provided. The method includes:

obtaining, by a base station, first feedback information of a terminal, where the first feedback information of the terminal includes m first beamforming codewords selected by the terminal;

determining, by the base station, m second beamforming codewords of the base station based on the m first beamforming codewords selected by the terminal;

performing, by the base station, beamforming for an antenna group in each polarization direction based on the m second beamforming codewords of the base station, and generating p antenna ports, where antennas in the antenna group in the polarization direction have a same polarization direction, and p is equal to m or p is equal to 2 m; and sending, by the base station, a second reference signal to the terminal on the p antenna ports.

The base station performs beamforming-based on the m selected first beamforming codewords fed back by the terminal, so that a multipath characteristic of a channel can he fully used, and communication robustness can be maintained in a high-speed movement scenario based on multipath diversity of the channel.

Optionally, the first feedback information of the terminal further includes a rank of a downlink channel state and a channel quality indicator calculated by the terminal; and after the sending, by the base station, a second reference signal to the terminal, the method further includes:

encoding, by the base station through precoding, a data channel on the p antenna ports based on the rank of the downlink channel state, and generating k antenna ports, where 0<k≤p; and transmitting, by the base station, data to the terminal on the k antenna ports by using the encoded data channel.

Optionally, the first feedback information of the terminal further includes a rank of a downlink channel state; and after the sending, by the base station, a second reference signal to the terminal, the method further includes:

obtaining, by the base station, second feedback information of the terminal, where the second feedback information includes sequence numbers of q antenna ports selected by the terminal and a calculated channel quality indicator; and determining, by the base station, q beams based on the channel quality indicator and the sequence numbers of the q antenna ports, performing beamforming for the antenna group in each polarization direction based on the q beams, and generating s antenna ports; and sending, by the base station, a third reference signal on the s antenna ports, where q≤p and s≤q.

Optionally, after the sending, by the base station, a third reference signal, the method further includes:

encoding, by the base station through precoding, a data channel on the s antenna ports based on the rank of the downlink channel state, and generating k antenna ports; and transmitting data to the terminal on the k antenna ports by using the encoded data channel.

Optionally, the encoding, by the base station through precoding, a data channel based on the rank of the downlink channel state includes:

when the rank of the downlink channel state is 1, if a quantity of the k antenna ports is an even number, encoding, by the base station, the data channel through SFBC precoding; otherwise, encoding, by the base station, the data channel through large delay cyclic diversity precoding; or when the rank of the downlink channel state is greater than 1, encoding, by the base station, the data channel through open-loop spatial multiplexing precoding; or when the rank of the downlink channel state is 1, encoding, by the base station, the data channel through large delay cyclic diversity precoding; or when the rank of the downlink channel state is greater than 1, encoding, by the base station, the data channel through open-loop spatial multiplexing precoding.

Optionally, before the obtaining, by a base station, first feedback information of a terminal, the method further includes:

notifying, by the base station, the terminal of a quantity M of beamforming needing to be reported by the terminal; and sending, by the base station, a first reference signal to the terminal on N dual-polarized antenna ports, where N is a positive integer greater than 0.

Optionally, before the obtaining, by a base station, first feedback information of a terminal, the method further includes:

sending, by the base station, a restricted set to the terminal, where the restricted set is a set including codewords selected by the base station from a codebook W1 having a rank of 1 in LTE Release 13 or is a set including codewords selected by the base station from a set including new codebooks obtained by performing linear weighted summation on some codewords in a codebook W1 having a rank of 1 in LIE Release 13.

According to a third aspect, a beamforming-based transmission method is provided. The method includes:

obtaining, by a terminal, a quantity M of beamforming vectors needing to be reported by the terminal and a first reference signal that are sent by a base station, where the first reference signal is sent by the base station on L antenna ports, M and L each are an integer greater than 0, and L>M;

estimating, by the terminal, downlink channel states on the L antenna ports based on the first reference signal;

selecting, by the terminal, m antenna ports, as beamforming vectors needing to be reported, from the L antenna ports based on the downlink channel states and the quantity M of beamforming vectors needing to be reported that is sent by the base station, and calculating a channel quality indicator, where m≤M; and feeding back, by the terminal, sequence numbers of the m antenna ports, the channel quality indicator, and ranks of the downlink channel states to the base station.

The terminal selects the m antenna ports, as the beamforming vectors needing to be reported, based on the downlink channel states and the quantity M of beamforming vectors needing to be reported that is sent by the base station, and feeds back the m antenna ports to the base station, so that a multipath characteristic of a channel can be fully used, and communication robustness can be maintained in a high-speed movement scenario based on multipath diversity of the channel.

Optionally, after the feeding back, by the terminal, sequence numbers of the m antenna ports, the channel quality indicator, and ranks of the downlink channel states to the base station, the method further includes:

obtaining, by the terminal, a second reference signal sent by the base station and data transmitted by the base station, where the data is transmitted by the base station on k antenna ports; and estimating, by the terminal, downlink channel states on the k antenna ports based on the second reference signal, and decoding, through precoding, a data channel based on ranks of the downlink channel states, where k is a positive integer greater than 0.

Optionally, the decoding, by the terminal through precoding, a data channel based on ranks of the downlink channel states includes:

when the rank of the downlink channel state is 1, if a quantity of the k antenna ports is an even number, decoding, by the terminal, the data channel through SFBC precoding; otherwise, decoding, by the terminal, the data channel through large delay cyclic diversity precoding; or when the rank of the downlink channel state is greater than 1, decoding, by the terminal, the data channel through open-loop spatial multiplexing precoding; or when the rank of the downlink channel state is 1, decoding, by the terminal, the data channel through large delay cyclic diversity precoding; or when the rank of the downlink channel state is greater than 1, decoding, by the terminal, the data channel through open-loop spatial multiplexing precoding.

Optionally, the terminal determines, by using the following step, the quantity m of the antenna ports selected from the L antenna ports:

determining, by the terminal, the quantity M of beamforming vectors needing to be reported that is sent by the base station, as the quantity m of the antenna ports selected from the L antenna ports.

Optionally, the terminal determines, by using the following steps, the quantity m of the antenna ports selected from the L antenna ports:

determining, by the terminal, the quantity m of the selected antenna ports based on the downlink channel states and the quantity M of beamforming vectors needing to be reported that is sent by the base station, so that channel quality after joint precoding of m optimal beamforming vectors is optimal; and feeding back, by the terminal, a selected value of m to the base station.

Optionally, the selecting, by the terminal, m antenna ports from the L antenna ports includes:

directly selecting, by the terminal, the m antenna ports from the L antenna ports; or performing, by the terminal, linear weighting on the L antenna ports, to obtain the m antenna ports.

According to a fourth aspect, a beamforming-based transmission method is provided. The method includes:

obtaining, by a base station, feedback information of a terminal, where the feedback information of the terminal includes sequence numbers of m antenna ports selected by the terminal and a channel quality indicator;

determining, by the base station, m first beamforming codewords based on the sequence numbers of the m antenna ports and the channel quality indicator;

performing, by the base station, beamforming for an antenna group in each polarization direction based on the m first beamforming codewords, and generating p antenna ports, where antennas in the antenna group in the polarization direction have a same polarization direction; and sending, by the base station, a second reference signal to the terminal on the p antenna ports, where p is equal to m or p is equal to 2 m.

The base station performs beamforming-based on the m antenna ports fed back by the terminal, so that a multipath characteristic of a channel can be fully used, and communication robustness can be maintained in a high-speed movement scenario based on multipath diversity of the channel.

Optionally, after the sending, by the base station, a second reference signal to the terminal on the p antenna ports, the method further includes:

the feedback information of the terminal further includes a rank of a downlink channel state; and encoding, by the base station through precoding, a data channel on the p antenna ports based on the rank of the downlink channel state, and generating k antenna ports; and transmitting, by the base station, data to the terminal on the k antenna ports by using the encoded data channel, where $0<k\leq p$.

Optionally, the encoding, by the base station through precoding, a data channel based on the rank of the downlink channel state includes:

when the rank of the downlink channel state is 1, if a quantity of the k antenna ports is an even number, encoding, by the base station, the data channel through SFBC precoding; otherwise, encoding, by the base station, the data channel through large delay cyclic diversity precoding; or when the rank of the downlink channel state is greater than 1, encoding, by the base station, the data channel through open-loop spatial multiplexing precoding; or when the rank of the downlink channel state is 1, encoding, by the base station, the data channel through large delay cyclic diversity precoding; or when the rank of the downlink channel state is greater than 1, encoding, by the base station, the data channel through open-loop spatial multiplexing precoding.

Optionally, before the obtaining, by a base station, feedback information of a terminal, the method further includes:

notifying, by the base station, the terminal of a quantity M of beamforming needing to be reported by the terminal; and performing, by the base station, beamforming on N dual-polarized antenna ports, and generating L antenna ports; and sending a first reference signal to the terminal on the L antenna ports, where N is a positive integer greater than 0.

According to a fifth aspect, a beamforming-based transmission apparatus is provided. The apparatus includes:

a transceiver unit, configured to obtain a quantity M of beamforming vectors needing to be reported by a terminal and a first reference signal that are sent by a base station, where the first reference signal is sent by the base station on N dual-polarized antenna ports, and M and N each are an integer greater than 0; and a processing unit, configured to: estimate downlink channel states on the N dual-polarized antenna ports based on the first reference signal obtained by the transceiver unit; and select m first beamforming codewords based on the downlink channel states and the quantity M of beamforming vectors needing to be reported that is sent by the base station, where m≤M, where the transceiver unit is further configured to feed back the m first beamforming codewords selected by the processing unit and ranks of the downlink channel states to the base station.

Optionally, the processing unit is specifically configured to:

determine the quantity M of beamforming vectors needing to be reported that is sent by the base station, as the quantity m of the selected first beamforming codewords.

Optionally, the processing unit is specifically configured to: determine the quantity m of the selected first beamforming codewords based on the downlink channel states and the quantity M of beamforming vectors needing to be reported that is sent by the base station, so that channel quality after joint preceding of m optimal beamforming vectors is optimal; and feed back a value of m to the base station by using the transceiver unit.

Optionally, the m selected first beamforming codewords are selected from a first codeword set, and the first codeword set is a codebook W1 having a rank of 1 in Long Term Evolution LTE Release 13 or is a set including new codebooks obtained by performing linear weighted summation on some codewords in a codebook W1 having a rank of 1 in LIE Release 13; or the first codeword set is a restricted set sent by the base station, and the restricted set is a set including codewords selected by the base station from a codebook W1 having a rank of 1 in LTE Release 13 or is a set including codewords selected by the base station from a set including new codebooks obtained by performing linear weighted summation on some codewords in a codebook W1 having a rank of 1 in LIE Release 13.

Optionally, the processing unit is specifically configured to:

estimate a radiation angle of an antenna of the base station, to determine m beamforming directions with optimal channel quality; and determine directional angle values of the m beamforming directions with optimal channel quality, where a directional angle value is a directional angle or a trigonometric function value of a directional angle.

Optionally, the processing unit is further configured to:

after the m selected first beamforming codewords and the ranks of the downlink channel states are fed back to the base station, calculate a channel quality indicator based on the selected first beamforming codewords and the ranks of the downlink channel states, and feed back the channel quality indicator to the base station by using the transceiver unit.

Optionally, the processing unit is further configured to:

after feeding back the channel quality indicator to the base station, obtain, by using the transceiver unit, a second reference signal sent by the base station and data transmitted by the base station, where the data is transmitted by the base station on k antenna ports; and estimate downlink channel states on the k antenna ports based on the second reference signal, and decode, through precoding, a data channel based on ranks of the downlink channel states, where k is a positive integer greater than 0.

Optionally, the processing unit is further configured to:

after the m selected first beamforming codewords and the ranks of the downlink channel states are fed back to the base station, obtain, by using the transceiver unit, a second reference signal sent by the base station, where the second reference signal is sent by the base station on p antenna ports; and estimate downlink channel states on the p antenna ports based on the second reference signal, select q antenna ports from the p antenna ports based on the downlink channel states, calculate a channel quality indicator, and feed back sequence numbers of the q antenna ports and the calculated channel quality indicator to the base station, where q≤p, and p is equal to m or p is equal to 2 m.

Optionally, the processing unit is further configured to:

after feeding back the sequence numbers of the q antenna ports and the calculated channel quality indicator to the base station, obtain, by using the transceiver unit, a third reference signal sent by the base station and data transmitted by the base station, where the data is transmitted by the base station on k antenna ports; and estimate downlink channel states on the k antenna ports based on the third reference signal, and decode, through precoding, a data channel based on ranks of the downlink channel states.

Optionally, the processing unit is specifically configured to:

when the rank of the downlink channel state is 1, if a quantity of the k antenna ports is an even number, decode the data channel through SFBC precoding; otherwise, decode the data channel through large delay cyclic diversity precoding; or when the rank of the downlink channel state is greater than 1, decode the data channel through open-loop spatial multiplexing precoding; or when the rank of the downlink channel state is 1, decode the data channel through large delay cyclic diversity precoding; or when the rank of the downlink channel state is greater than 1, decode the data channel through open-loop spatial multiplexing precoding.

According to a sixth aspect, a beamforming-based transmission apparatus is provided. The apparatus includes:

a transceiver unit, configured to obtain first feedback information of a terminal, where the first feedback information of the terminal includes m first beamforming codewords selected by the terminal; and a processing unit, configured to: determine m second beamforming codewords of a base station based on the m first beamforming codewords selected by the terminal; and perform beamforming for an antenna group in each polarization direction based on the m second beamforming codewords of the base station, and generate p antenna ports, where antennas in the antenna group in the polarization direction have a same polarization direction, and p is equal to m or p is equal to 2 m, where the transceiver unit is further configured to send a second reference signal to the terminal on the p antenna ports.

Optionally, the first feedback information of the terminal further includes a rank of a downlink channel state and a channel quality indicator calculated by the terminal; and the processing unit is further configured to:

after the second reference signal is sent to the terminal, encode, through precoding, a data channel on the p antenna ports based on the rank of the downlink channel state, and generate k antenna ports, where 0<k≤p; and transmit, by using the transceiver unit, data to the terminal on the k antenna ports by using the encoded data channel.

Optionally, the first feedback information of the terminal further includes a rank of a downlink channel state; and the processing unit is further configured to:

after the second reference signal is sent to the terminal, obtain second feedback information of the terminal by using the transceiver unit, where the second feedback information includes sequence numbers of q antenna ports selected by the terminal and a calculated channel quality indicator; and determine q beams based on the channel quality indicator and the sequence numbers of the q antenna ports, perform beamforming for the antenna group in each polarization direction based on the q beams, and generate s antenna ports; and send a third reference signal on the s antenna ports, where q≤p and a≤q.

Optionally, the processing unit is further configured to:

after sending the third reference signal, encode, through precoding, the data channel on the s antenna ports based on the rank of the downlink channel state, and generate k antenna ports; and transmit, by using the transceiver unit, data to the terminal on the k antenna ports by using the encoded data channel.

Optionally, the processing unit is specifically configured to:

when the rank of the downlink channel state is 1, if a quantity of the k antenna ports is an even number, encode the data channel through SFBC precoding; otherwise, encode the data channel through large delay cyclic diversity precoding; or when the rank of the downlink channel state is greater than 1, encode the data channel through open-loop spatial multiplexing precoding; or when the rank of the downlink channel state is 1, encode the data channel through large delay cyclic diversity precoding; or when the rank of the downlink channel state is greater than 1, encode the data channel through open-loop spatial multiplexing precoding.

Optionally, the transceiver unit is further configured to:
before obtaining the first feedback information of the terminal, notify the terminal of a quantity M of beamforming needing to be reported by the terminal; and
send a first reference signal to the terminal on N dual-polarized antenna ports, where N is a positive integer greater than 0.

Optionally, the transceiver unit is further configured to:
before obtaining the first feedback information of the terminal, send a restricted set to the terminal, where the restricted set is a set including codewords selected from a codebook W1 having a rank of 1 in LTE Release 13 or is a set including codewords selected from a set including new codebooks obtained by performing linear weighted summation on some codewords in a codebook W1 having a rank of 1 in LTE Release 13.

According to a seventh aspect, a beamforming-based transmission apparatus is provided. The apparatus includes:
a transceiver unit, configured to obtain a quantity M of beamforming vectors needing to be reported by a terminal and a first reference signal that are sent by a base station, where the first reference signal is sent by the base station on L antenna ports, M and L each are an integer greater than 0, and L>M; and
a processing unit, configured to: estimate downlink channel states on the L antenna ports based on the first reference signal; and select m antenna ports, as beamforming vectors needing to be reported, from the L antenna ports based on the downlink channel states and the quantity M of beamforming vectors needing to be reported that is sent by the base station, and calculate a channel quality indicator, where m≤M, where
the transceiver unit is further configured to feed back sequence numbers of the m antenna ports, the channel quality indicator, and ranks of the downlink channel states to the base station.

Optionally, the processing unit is further configured to:
after the sequence numbers of the m antenna ports, the channel quality indicator, and the ranks of the downlink channel states are fed back to the base station, obtain, by using the transceiver unit, a second reference signal sent by the base station and data transmitted by the base station, where the data is transmitted by the base station on k antenna ports; and
estimate downlink channel states on the k antenna ports based on the second reference signal, and decode, through precoding, a data channel based on ranks of the downlink channel states, where k is a positive integer greater than 0.

Optionally, the processing unit is specifically configured to:
when the rank of the downlink channel state is 1, if a quantity of the k antenna ports is an even number, decode the data channel through SFBC precoding; otherwise, decode the data channel through large delay cyclic diversity precoding; or when the rank of the downlink channel state is greater than 1, decode the data channel through open-loop spatial multiplexing precoding; or
when the rank of the downlink channel state is 1, decode the data channel through large delay cyclic diversity precoding; or when the rank of the downlink channel state is greater than 1, decode the data channel through open-loop spatial multiplexing precoding.

Optionally, the processing unit is specifically configured to:
determine the quantity M of beamforming vectors needing to be reported that is sent by the base station, as the quantity m of the antenna ports selected from the L antenna ports.

Optionally, the processing unit is specifically configured to:
determine the quantity m of the selected antenna ports based on the downlink channel states and the quantity M of beamforming vectors needing to be reported that is sent by the base station, so that channel quality after joint precoding of m optimal beamforming vectors is optimal; and
feed back a selected value of m to the base station by using the transceiver unit.

Optionally, the processing unit is specifically configured to:
directly select the m antenna ports from the L antenna ports; or
perform linear weighting on the 1, antenna ports, to obtain the m antenna ports.

According to an eighth aspect, a beamforming-based transmission apparatus is provided. The apparatus includes:
a transceiver unit, configured to obtain feedback information of a terminal, where the feedback information of the terminal includes sequence numbers of m antenna ports selected by the terminal and a channel quality indicator; and
a processing unit, configured to: determine m first beamforming codewords based on the sequence numbers of the m antenna ports and the channel quality indicator; and perform beamforming for an antenna group in each polarization direction based on the m first beamforming codewords, and generate p antenna ports, where antennas in the antenna group in the polarization direction have a same polarization direction, where
the transceiver unit is further configured to send a second reference signal to the terminal on the p antenna ports, where p is equal to m or p is equal to 2 m.

Optionally, the processing unit is further configured to:
the feedback information of the terminal further includes a rank of a downlink channel state; and
after the second reference signal is sent to the terminal on the p antenna ports, encode, through precoding, a data channel on the p antenna ports based on the rank of the downlink channel state, and generate k antenna ports; and
transmit, by using the transceiver unit, data to the terminal on the k antenna ports by using the encoded data channel, where 0<k≤p.

Optionally, the processing unit is specifically configured to:
when the rank of the downlink channel state is 1, if a quantity of the k antenna ports is an even number, encode the data channel through SFBC precoding; otherwise, encode the data channel through large delay cyclic diversity precoding; or when the rank of the downlink channel state is greater than 1, encode the data channel through open-loop spatial multiplexing precoding; or
when the rank of the downlink channel state is 1, encode the data channel through large delay cyclic diversity precoding; or when the rank of the downlink channel state is greater than 1, encode the data channel through open-loop spatial multiplexing precoding.

Optionally, the transceiver unit is further configured to:
before obtaining the feedback information of the terminal, notify the terminal of a quantity M of beamforming needing to be reported by the terminal; and perform beamforming on N dual-polarized antenna ports, and generate L antenna ports; and send a first reference signal to the terminal on the L antenna ports, where N is a positive integer greater than 0.

According to a ninth aspect, a beamforming-based transmission device is provided. The device includes a transceiver, a processor, and a memory;

the transceiver obtains a quantity M of beamforming vectors needing to be reported by a terminal and a first reference signal that are sent by a base station, where the first reference signal is sent by the base station on N dual-polarized antenna ports, and M and N each are an integer greater than 0;

the processor estimates downlink channel states on the N dual-polarized antenna ports based on the first reference signal obtained by the transceiver; and selects m first beamforming codewords based on the downlink channel states and the quantity M of beamforming vectors needing to he reported that is sent by the base station, where m≤M; and the transceiver feeds back the m first beamforming codewords selected by the processor and ranks of the downlink channel states to the base station.

Optionally, the processor determines the quantity M of beamforming vectors needing to be reported that is sent by the base station, as the quantity m of the selected first beamforming codewords.

Optionally, the processor determines the quantity m of the selected first beamforming codewords based on the downlink channel states and the quantity M of beamforming vectors needing to be reported that is sent by the base station, so that channel quality after joint precoding of m optimal beamforming vectors is optimal; and the processor feeds back a value of m to the base station by using the transceiver.

Optionally, the m selected first beamforming codewords are selected from a first codeword set, and the first codeword set is a codebook W1 having a rank of 1 in Long Term Evolution LTE Release 13 or is a set including new codebooks obtained by performing linear weighted summation on some codewords in a codebook W1 having a rank of 1 in LTE Release 13; or the first codeword set is a restricted set sent by the base station, and the restricted set is a set including codewords selected by the base station from a codebook W1 having a rank of 1 in LTE Release 13 or is a set including codewords selected by the base station from a set including new codebooks obtained by performing linear weighted summation on some codewords in a codebook W1 having a rank of 1 in LIE Release 13.

Optionally, the processor estimates a radiation angle of an antenna of the base station, to determine m beamforming directions with optimal channel quality; and determines directional angle values of the m beamforming directions with optimal channel quality, where a directional angle value is a directional angle or a trigonometric function value of a directional angle.

Optionally, after the m selected first beamforming codewords and the ranks of the downlink channel states are fed back to the base station, the processor calculates a channel quality indicator based on the selected first beamforming codewords and the ranks of the downlink channel states, and feeds back the channel quality indicator to the base station by using the transceiver.

Optionally, after feeding back the channel quality indicator to the base station, the processor obtains, by using the transceiver, a second reference signal sent by the base station and data transmitted by the base station, where the data is transmitted by the base station on k antenna ports; and estimates downlink channel states on the k antenna ports based on the second reference signal, and decodes, through preceding, a data channel based on ranks of the downlink channel states, where k is a positive integer greater than 0.

Optionally, after the m selected first beamforming codewords and the ranks of the downlink channel states are fed back to the base station, the processor obtains, by using the transceiver, a second reference signal sent by the base station, where the second reference signal is sent by the base station on p antenna ports; and the processor estimates downlink channel states on the p antenna ports based on the second reference signal, selects q antenna ports from the p antenna ports based on the downlink channel states, calculates a channel quality indicator, and feeds back sequence numbers of the q antenna ports and the calculated channel quality indicator to the base station, where q≤p, and p is equal to m or p is equal to 2 m.

Optionally, after feeding back the sequence numbers of the q antenna ports and the calculated channel quality indicator to the base station, the processor obtains, by using the transceiver, a third reference signal sent by the base station and data transmitted by the base station, where the data is transmitted by the base station on k antenna ports; and the processor estimates downlink channel states on the k antenna ports based on the third reference signal, and decodes, through precoding, a data channel based on ranks of the downlink channel states.

Optionally, when the rank of the downlink channel state is 1, if a quantity of the k antenna ports is an even number, the processor decodes the data channel through SFBC precoding; otherwise, the processor decodes the data channel through large delay cyclic diversity precoding; or when the rank of the downlink channel state is greater than 1, the processor decodes the data channel through open-loop spatial multiplexing precoding; or when the rank of the downlink channel state is 1, the processor decodes the data channel through large delay cyclic diversity precoding; or when the rank of the downlink channel state is greater than 1, the processor decodes the data channel through open-loop spatial multiplexing precoding.

According to a tenth aspect, a beamforming-based transmission device is provided. The device includes a transceiver, a processor, and a memory;

the transceiver obtains first feedback information of a terminal, where the first feedback information of the terminal includes m first beamforming codewords selected by the terminal;

the processor determines m second beamforming codewords of a base station based on the m first beamforming codewords selected by the terminal; and performs beamforming for an antenna group in each polarization direction based on the m second beamforming codewords of the base station, and generates p antenna ports, where antennas in the antenna group in the polarization direction have a same polarization direction, and p is equal to m or p is equal to 2 m; and the transceiver sends a second reference signal to the terminal on the p antenna ports.

Optionally, the first feedback information of the terminal further includes a rank of a downlink channel state and a channel quality indicator calculated by the terminal; and after the second reference signal is sent to the terminal, the processor encodes, through precoding, a data channel on the p antenna ports based on the rank of the downlink channel state, and generates k antenna ports, where 0<k≤p; and transmits, by using the transceiver, data to the terminal on the k antenna ports by using the encoded data channel.

Optionally, the first feedback information of the terminal further includes a rank of a downlink channel state; and
after the second reference signal is sent to the terminal, the processor obtains second feedback information of the terminal by using the transceiver, where the second feedback information includes sequence numbers of q antenna ports selected by the terminal and a calculated channel quality indicator; and
the processor determines q beams based on the channel quality indicator and the sequence numbers of the q antenna ports, performs beamforming for the antenna group in each polarization direction based on the q beams, and generates s antenna ports; and sends a third reference signal on the s antenna ports by using the transceiver, where q≤p, and s≤q.

Optionally, after sending the third reference signal, the processor encodes, through precoding, the data channel on the s antenna ports based on the rank of the downlink channel state, and generates k antenna ports; and transmits, by using the transceiver, data to the terminal on the k antenna ports by using the encoded data channel.

Optionally, when the rank of the downlink channel state is 1, if a quantity of the k antenna ports is an even number, the processor encodes the data channel through SFBC precoding; otherwise, the processor encodes the data channel through large delay cyclic diversity precoding; or when the rank of the downlink channel state is greater than 1, the processor encodes the data channel through open-loop spatial multiplexing precoding; or
when the rank of the downlink channel state is 1, the processor encodes the data channel through large delay cyclic diversity precoding; or when the rank of the downlink channel state is greater than 1, the processor encodes the data channel through open-loop spatial multiplexing precoding.

Optionally, before obtaining the first feedback information of the terminal, the transceiver notifies the terminal of a quantity M of beamforming needing to be reported by the terminal; and sends a first reference signal to the terminal on N dual-polarized antenna ports, where N is a positive integer greater than 0.

Optionally, before obtaining the first feedback information of the terminal, the transceiver sends a restricted set to the terminal, where the restricted set is a set including codewords selected from a codebook W1 having a rank of 1 in LTE Release 13 or is a set including codewords selected from a set including new codebooks obtained by performing linear weighted summation on some codewords in a codebook W1 having a rank of 1 in LTE Release 13.

According to an eleventh aspect, a beamforming-based transmission device is provided. The device includes a transceiver, a processor, and a memory;
the transceiver obtains a quantity NI of beamforming vectors needing to be reported by a terminal and a first reference signal that are sent by a base station, where the first reference signal is sent by the base station on L antenna ports, M and L each are an integer greater than 0, and L>M; and
the processor estimates downlink channel states on the L antenna ports based on the first reference signal; and selects m antenna ports, as beamforming vectors needing to be reported, from the L antenna ports based on the downlink channel states and the quantity M of beamforming vectors needing to be reported that is sent by the base station, and calculates a channel quality indicator, where m≤M; and
a transceiver is further configured to feed back sequence numbers of the m antenna ports, the channel quality indicator, and ranks of the downlink channel states to the base station.

Optionally, after the sequence numbers of the m antenna ports, the channel quality indicator, and the ranks of the downlink channel states are fed back to the base station, the processor obtains, by using the transceiver, a second reference signal sent by the base station and data transmitted by the base station, where the data is transmitted by the base station on k antenna ports; and
the processor estimates downlink channel states on the k antenna ports based on the second reference signal, and decodes, through precoding, a data channel based on ranks of the downlink channel states, where k is a positive integer greater than 0.

Optionally, when the rank of the downlink channel state is 1, if a quantity of the k antenna ports is an even number, the processor decodes the data channel through SFBC precoding; otherwise, the processor decodes the data channel through large delay cyclic diversity precoding; or when the rank of the downlink channel state is greater than 1, the processor decodes the data channel through open-loop spatial multiplexing precoding; or
when the rank of the downlink channel state is 1, the processor decodes the data channel through large delay cyclic diversity precoding; or when the rank of the downlink channel state is greater than 1, the processor decodes the data channel through open-loop spatial multiplexing precoding.

Optionally, the processor determines the quantity M of beamforming vectors needing to be reported that is sent by the base station, as the quantity m of the antenna ports selected from the L antenna ports.

Optionally, the processor determines the quantity m of the selected antenna ports based on the downlink channel states and the quantity M of beamforming vectors needing to be reported that is sent by the base station, so that channel quality after joint precoding of m optimal beamforming vectors is optimal; and
the processor feeds back a selected value of m to the base station by using the transceiver.

Optionally, the processor directly selects the m antenna ports from the L antenna ports; or
the processor performs linear weighting on the L antenna ports, to obtain the m antenna ports.

According to a twelfth aspect, a beamforming-based transmission device is provided. The device includes a transceiver, a processor, and a memory;
the transceiver obtains feedback information of a terminal, where the feedback information of the terminal includes sequence numbers of m antenna ports selected by the terminal and a channel quality indicator;
the processor determines m first beamforming codewords based on the sequence numbers of the m antenna ports and the channel quality indicator; and performs beamforming for an antenna group in each polarization direction based on the m first beamforming codewords, and generates p antenna ports, where antennas in the antenna group in the polarization direction have a same polarization direction; and the transceiver is further configured to send a second reference signal to the terminal on the p antenna ports, where p is equal to m or p is equal to 2 m.

Optionally, the feedback information of the terminal further includes a rank of a downlink channel state; and after the second reference signal is sent to the terminal on the p antenna ports, the processor encodes, through precoding, a data channel on the p antenna ports based on the rank of the downlink channel state, and generates k antenna ports; and the processor transmits, by using the transceiver, data to the terminal on the k antenna ports by using the encoded data channel, where 0<k≤p.

Optionally, when the rank of the downlink channel state is 1, if a quantity of the k antenna ports is an even number, the processor encodes the data channel through SFBC precoding; otherwise, the processor encodes the data channel through large delay cyclic diversity precoding; or when the rank of the downlink channel state is greater than 1, the processor encodes the data channel through open-loop spatial multiplexing precoding; or when the rank of the downlink channel state is 1, the processor encodes the data channel through large delay cyclic diversity precoding; or when the rank of the downlink channel state is greater than 1, the processor encodes the data channel through open-loop spatial multiplexing precoding.

Optionally, before obtaining the feedback information of the terminal, the transceiver notifies the terminal of a quantity M of beamforming needing to be reported by the terminal; and the transceiver performs beamforming on N dual-polarized antenna ports, and generates L antenna ports; and sends a first reference signal to the terminal on the L antenna ports, where N is a positive integer greater than 0.

The embodiments of the present invention indicate that, the terminal obtains the quantity M of beamforming vectors needing to be reported by the terminal and the first reference signal that are sent by the base station; estimates the downlink channel states on the N dual-polarized antenna ports based on the first reference signal; selects the m first beamforming codewords based on the downlink channel states and the quantity M of beamforming vectors needing to be reported that is sent by the base station; and then feeds back the m selected first beamforming codewords and the ranks of the downlink channel states to the base station. The terminal selects the m first beamforming codewords based on the downlink channel states and the quantity M of beamforming vectors needing to be reported that is sent by the base station, and feeds back the m first beamforming codewords to the base station, so that the multipath characteristic of the channel can be fully used, and the communication robustness can be maintained in the high-speed movement scenario based on the multipath diversity of the channel.

BRIEF DESCRIPTION OF DRAWINGS

To describe the technical solutions in the embodiments of the present invention more clearly, the following briefly describes the accompanying drawings required for describing the embodiments.

DESCRIPTION OF EMBODIMENTS

To make the objectives, technical solutions, and advantages of the present invention clearer, the following further describes the present invention in detail with reference to the accompanying drawings and embodiments.

Figure 1:
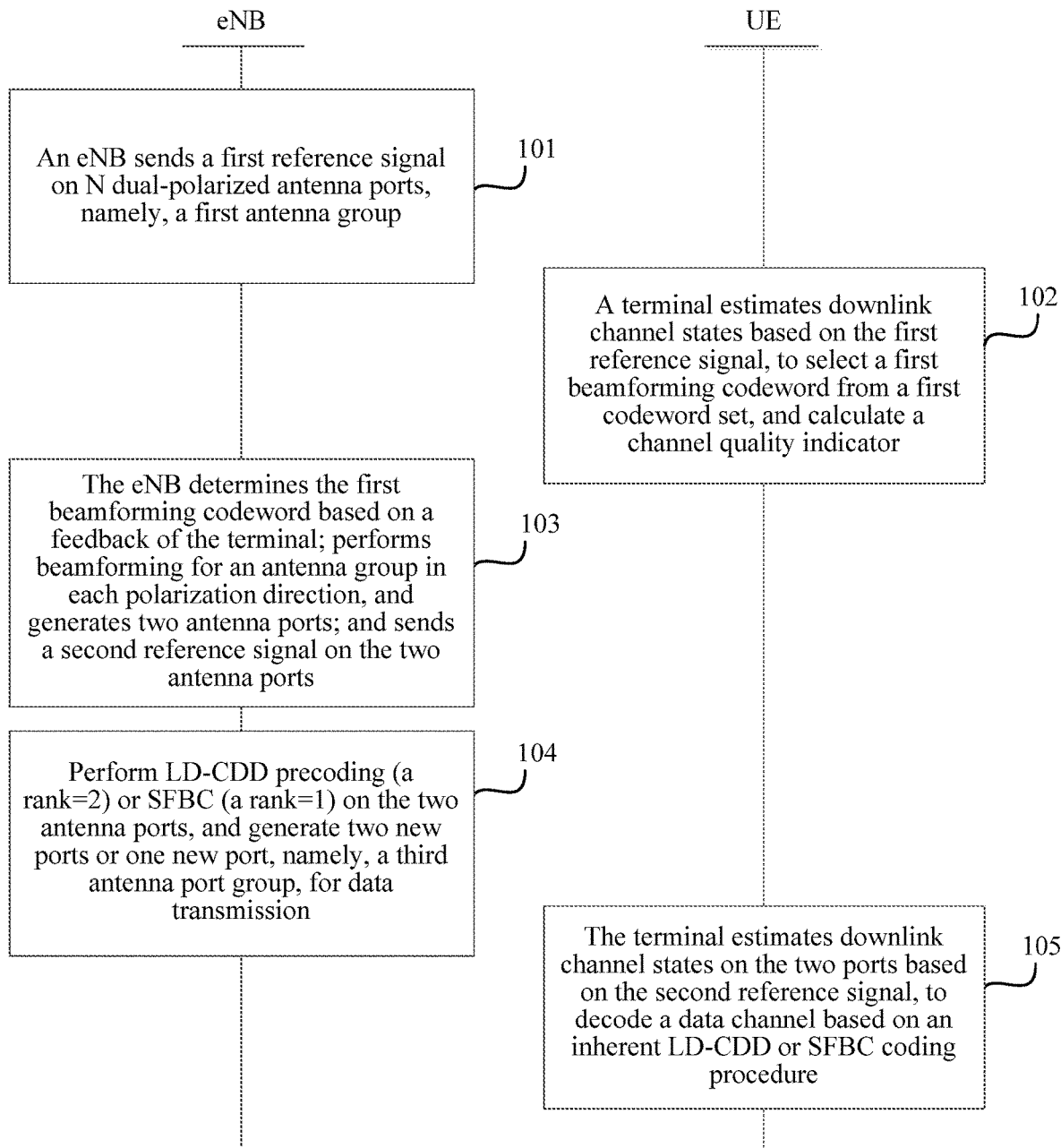
FIG. 1 is a schematic flowchart of beamforming-based transmission in the prior art.
Figure 2:
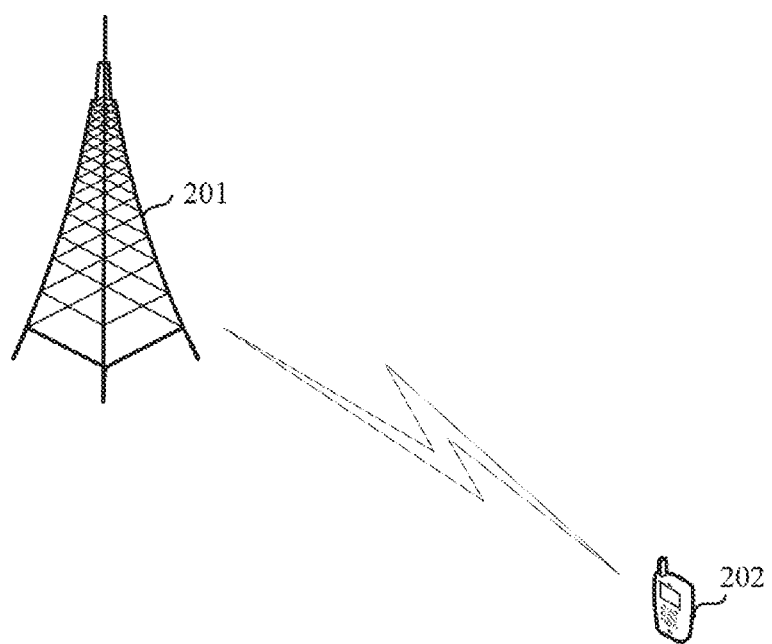
FIG. 2 is a schematic diagram of a system architecture according to an embodiment of the present invention.

FIG. 2 shows a system architecture to which an embodiment of the present invention is applicable. A beamforming-based transmission procedure can be implemented based on the system architecture. The system architecture for beamforming-based transmission that is provided in this embodiment of the present invention includes an LTE (Long Term Evolution, Long Term Evolution) eNodeB 201 and a terminal 202.

In this embodiment of the present invention, the terminal 202 may be a device (device) providing voice and/or data connectivity for a user, and includes a wireless terminal. The wireless terminal may be a handheld device having a wireless connection function, another processing device connected to a wireless modem, or a mobile terminal that communicates with one or more core networks by using a radio access network. For example, the wireless terminal may be a mobile phone (also referred to as a "cellular" phone) and a computer with a mobile terminal. For another example, the wireless terminal may be a portable, pocket-sized, handheld, computer-built-in, or in-vehicle mobile device. For still another example, the wireless terminal may be a part of a mobile station (Mobile Station), an access point (Access point), or user equipment (User Equipment, UE for short).

The terminal 202 may communicate with the eNodeB 201 by using an air interface, to implement the beamforming-based transmission procedure.

Figure 3:
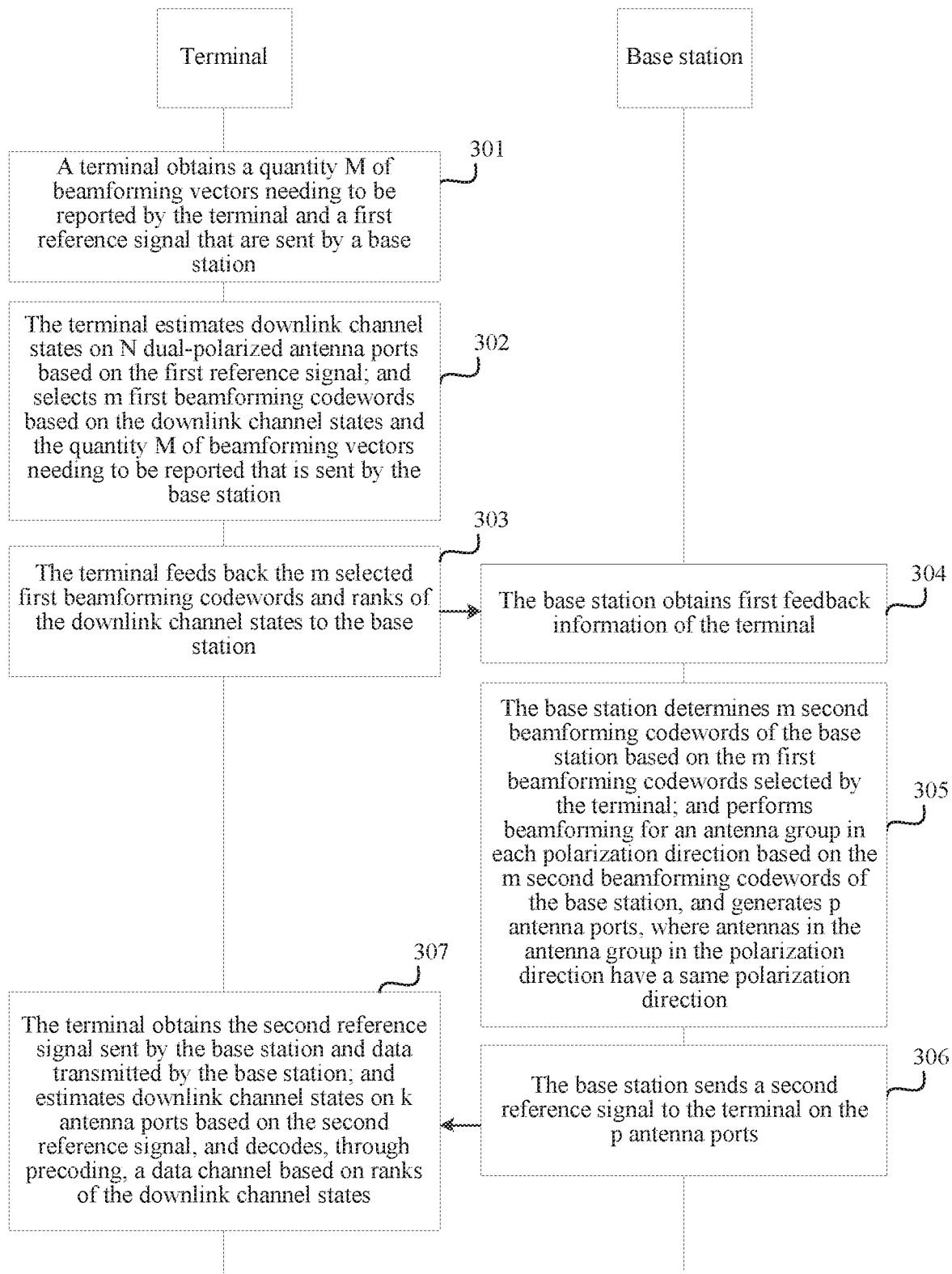
FIG. 3 is a schematic flowchart of a beamforming-based transmission method according to an embodiment of the present invention.

Based on the foregoing descriptions, FIG. 3 shows a procedure of a beamforming-based transmission method according to an embodiment of the present invention. The procedure may be performed by a beamforming-based transmission apparatus.

As shown in FIG. 3, the procedure includes the following specific steps.

Step 301: A terminal obtains a quantity M of beamforming vectors needing to be reported by the terminal and a first reference signal that are sent by a base station.

Step 302: The terminal estimates downlink channel states on N dual-polarized antenna ports based on the first reference signal; and selects m first beamforming codewords based on the downlink channel states and the quantity M of beamforming vectors needing to be reported that is sent by the base station.

Step 303: The terminal feeds back the m selected first beamforming codewords and ranks of the downlink channel states to the base station.

Step 304: The base station obtains first feedback information of the terminal.

Step 305: The base station determines m second beamforming codewords of the base station based on the m first beamforming codewords selected by the terminal; and performs beamforming for an antenna group in each polarization direction based on the m second beamforming codewords of the base station, and generates p antenna ports, where antennas in the antenna group in the polarization direction have a same polarization direction.

Step 306: The base station sends a second reference signal to the terminal on the p antenna ports.

Step 307: The terminal obtains the second reference signal sent by the base station and data transmitted by the base station; and estimates downlink channel states on k antenna ports based on the second reference signal, and decodes, through precoding, a data channel based on ranks of the downlink channel states.

In step 301, the first reference signal is sent by the base station on the N dual-polarized antenna ports, where M and N each are an integer greater than 0.

Before step 301, the base station further needs to notify the terminal of the quantity M of beamforming needing to be reported by the terminal, and sends the first reference signal to the terminal on the N dual-polarized antenna ports. When calculating the quantity M of beamforming needing to be reported by the terminal, the base station may determine the quantity M based on a polarization direction of an antenna. For example, when different beamforming vectors are used in two polarization directions, the base station may determine that a minimum value of M is 2; or when a same beamforming vector is used in two polarization directions, the base station may determine that a minimum value of M is 1. The base station may send M to the terminal, so that the terminal reports the quantity of beamforming vectors. The quantity M of beamforming is sent by the base station by using a system message or a Radio Resource Control message.

In step 302, after the terminal obtains the first reference signal and the beamforming vectors needing to be reported that are sent by the base station, the terminal estimates the downlink channel states on the N dual-polarized antenna ports based on the first reference signal, and then selects the m first beamforming codewords based on the downlink channel states and the quantity M of beamforming vectors needing to be reported that is sent by the base station, where m≤M.

In a process of determining the quantity m of first beamforming codewords needing to be selected, the terminal may determine a value of m in the following manners:

Manner 1

The terminal determines the quantity M of beamforming vectors needing to be reported that is sent by the base station, as the quantity m of the selected first beamforming codewords. To be specific, for any quantity of beamforming vectors to be reported by the terminal that is indicated by the base station, the terminal performs no processing, but directly reports, to the base station, the quantity of beamforming needed by the base station.

Manner 2

The terminal determines the quantity m of the selected first beamforming codewords based on the estimated downlink channel states and the quantity M of beamforming vectors needing to be reported that is sent by the base station, so that channel quality after joint precoding of m optimal beamforming vectors is optimal; and the terminal feeds back the value of m to the base station. The terminal determines, based on the downlink channel states, a quantity of downlink channels having optimal channel quality, as the quantity m of the selected first beamforming codewords, to improve beamforming-based transmission quality.

Based on the foregoing two manners of determining the value of m, the terminal selects the m first beamforming codewords. Specifically, the m first beamforming codewords selected by the terminal are selected from a first codeword set, and the first codeword set is a codebook W1 having a rank of 1 in LIE Release 13 and Release 14 or is a set including new codebooks obtained by performing linear weighted summation on some codewords in a codebook W1 having a rank of 1 in LTE Release 13 and Release 14. The codebook W1 having the rank of 1 in LTE Release 13 and Release 14 may be a codebook W1 having a rank of 1 and defined as 18, 12, 16, 20, 24, 28, 321 in LIE Release 13 and Release 14.

Correspondingly, the first codeword set may also be a restricted set sent by the base station, and the restricted set may be a set including codewords selected by the base station from a codebook W1 having a rank of 1 in LIE Release 13 and Release 14 or may be a set including codewords selected by the base station from a set including new codebooks obtained by performing linear weighted summation on some codewords in a codebook W1 having a rank of 1 in LTE Release 13. The base station sorts and numbers codewords in the codebook W1 having the rank of 1 in LTE Release 13 and Release 14, and then selects codewords from a set of the sorted and numbered codewords, to form the restricted set. The codebook W1 having the rank of 1 in LTE Release 13 and Release 14 may be a codebook W1 having a rank of 1 and defined as {8, 12, 16, 20, 24, 28, 32} in LTE Release 13 and Release 14.

To make the first beamforming codeword selected by the terminal better, when selecting the m first beamforming codewords, the terminal may estimate a radiation angle of an antenna of the base station, to determine m beamforming directions with optimal channel quality; and then determine directional angle values of the m beamforming directions with optimal channel quality, where the directional angle value may be a directional angle or a trigonometric function value of a directional angle, such as a sine value or a tangent value. The terminal feeds back the directional angle values of the m beamforming directions with optimal channel quality as a feedback parameter to the base station, so that the base station performs beamforming.

Optionally, after step 303, namely, the terminal feeds back the m selected first beamforming codewords and ranks of the downlink channel states to the base station, the terminal calculates a channel quality indicator based on the selected first beamforming codewords and the ranks of the downlink channel states, and feeds back the channel quality indicator to the base station. After the terminal feeds back the channel quality indicator to the base station, the terminal may obtain the second reference signal sent by the base station and the data transmitted by the base station, where the data is transmitted by the base station on the k antenna ports. The terminal may estimate the downlink channel states on the k antenna ports based on the second reference signal, and then decode, through preceding, the data channel based on the ranks of the downlink channel states, where k is a positive integer greater than 0, and $0 < k \leq p$.

Correspondingly, after step 303, namely, the terminal feeds back the m selected first beamforming codewords and ranks of the downlink channel states to the base station, the terminal obtains the second reference signal sent by the base station. The second reference signal is sent by the base station on the p antenna ports. Then the terminal estimates downlink channel states on the p antenna ports based on the second reference signal; and selects q antenna ports from the p antenna ports based on the downlink channel states, and calculates a channel quality indicator; and feeds back sequence numbers of the q antenna ports and the calculated channel quality indicator to the base station, where $q \leq p$. When the base station sends the second reference signal on the p antenna ports, the base station needs to determine a value of p, and the value of p is related to the quantity m of first beamforming vectors that is fed back by the terminal. For example, when different beamforming vectors are used in two polarization directions of antennas, p=m; or when a same beamforming vector is used in two polarization directions of antennas, p=2 m. Further, after the terminal feeds back the sequence numbers of the q antenna ports and the calculated channel quality indicator to the base station, the terminal obtains a third reference signal sent by the base station and data transmitted by the base station, where the data is transmitted by the base station on the k antenna ports. The base station encodes, through precoding, the data channel on the k antenna ports based on the ranks of the downlink channel states that are fed back by the terminal, and then transmits the data to the terminal on the encoded data channel. After obtaining the data transmitted by the base station, the terminal estimates the downlink channel states on the k antenna ports based on the received third reference signal, and then decodes, through precoding, the data channel based on the ranks of the downlink channel states.

To fully use a multipath characteristic of a channel during beamforming-based transmission, so that the terminal can flexibly perform diversity and multiplexing in a high-speed movement scenario, when decoding, through precoding, the data channel based on the ranks of the downlink channel states, the terminal may decode the data channel in the following several manners:

Manner 1

When the rank of the downlink channel state is 1, if a quantity of the k antenna ports is an even number, the terminal decodes the data channel through SFBC precoding; or when the rank of the downlink channel state is greater than 1, the terminal decodes the data channel through open-loop spatial multiplexing precoding, for example, the terminal uses LD-CDD precoding of Layer 1.

Manner 2

When the rank of the downlink channel state is 1, if a quantity of the k antenna ports is an odd number, the terminal decodes the data channel through large delay cyclic diversity precoding, for example, the terminal uses LD-CDD precoding of Layer 1; or when the rank of the downlink channel state is greater than 1, the terminal decodes the data channel through open-loop spatial multiplexing precoding, for example, the terminal uses LD-CDD precoding.

Manner 3

When the rank of the downlink channel state is 1, the terminal decodes the data channel through large delay cyclic diversity precoding, for example, the terminal uses LD-CDD precoding of Layer 1; or when the rank of the downlink channel state is greater than 1, the terminal decodes the data channel through open-loop spatial multiplexing precoding, for example, the terminal uses LD-CDD precoding.

In step 305, after the base station obtains the first feedback information of the terminal, where the first feedback information includes the m first beamforming codewords selected by the terminal, the base station determines the m second beamforming codewords of the base station based on the m first beamforming codewords selected by the terminal; and then performs beamforming for the antenna group in each polarization direction based on the m second beamforming codewords of the base station, and generates the p antenna ports. The antennas in the antenna group in each polarization direction have the same polarization direction, and each group includes N/2 antenna ports. A value of p is related to the quantity m of first beamforming vectors that is fed back by the terminal. For example, when different beamforming vectors are used in two polarization directions of antennas, p=m; or when a same beamforming vector is used in two polarization directions of antennas, p=2 m. The base station sends the second reference signal to the terminal on the p antenna ports.

Optionally, the first feedback information of the terminal obtained by the base station further includes the ranks of the downlink channel states and the channel quality indicator calculated by the terminal; and after the base station sends the second reference signal to the terminal, the base station encodes, through precoding, the data channel on the p antenna ports based on the ranks of the downlink channel states, and generates the k antenna ports; and then transmits the data to the terminal on the k antenna ports by using the encoded data channel.

Correspondingly, if the first feedback information of the terminal obtained by the base station further includes the ranks of the downlink channel states, after the base station sends the second reference signal to the terminal, the base station obtains second feedback information of the terminal, where the second feedback information includes the sequence numbers of the q antenna ports selected by the terminal and the calculated channel quality indicator. The second feedback information is sent by the terminal after the terminal estimates the downlink channel states on the p antenna ports based on the received second reference signal sent by the base station; and selects the q antenna ports from the p antenna ports based on the downlink channel states, and calculates the channel quality indicator.

The base station determines q beams based on the obtained channel quality indicator and the obtained sequence numbers of the q antenna ports, performs beamforming for the antenna group in each polarization direction based on the q beams, and generates s antenna ports; and the base station sends a third reference signal on the s antenna ports based on the s antenna ports, where q≤p and s≤q. The third reference signal may be used by the terminal to estimate a downlink channel state.

To fully use the multipath characteristic of the channel, after sending the third reference signal, the base station encodes, through precoding, the data channel on the s antenna ports based on the ranks of the downlink channel states, and generates the k antenna ports; and transmits the data to the terminal on the k antenna ports by using the encoded data channel. The terminal may decode, through precoding the data channel on the k antenna ports based on the ranks of the downlink channel states, to obtain the data transmitted by the base station.

Specifically, when encoding, through precoding, the data channel based on the ranks of the downlink channel states, the base station may encode the data channel in the following several manners:

Manner 1

When the rank of the downlink channel state is 1, if a quantity of the k antenna ports is an even number, the base station encodes the data channel through SFBC precoding; or when the rank of the downlink channel state is greater than 1, the base station encodes the data channel through open-loop spatial multiplexing precoding, for example, the base station uses LD-CDD precoding of Layer 1.

Manner 2

When the rank of the downlink channel state is 1, if a quantity of the k antenna ports is an odd number, the base station encodes the data channel through large delay cyclic diversity precoding, for example, the base station uses LD-CDD precoding of Layer 1; or when the rank of the downlink channel state is greater than 1, the base station encodes the data channel through open-loop spatial multiplexing precoding, for example, the base station uses LD-CDD precoding.

Manner 3

When the rank of the downlink channel state is 1, the base station encodes the data channel through large delay cyclic diversity precoding, for example, the base station uses LD-CDD precoding of Layer 1; or when the rank of the downlink channel state is greater than 1, the base station encodes the data channel through open-loop spatial multiplexing precoding, for example, the base station uses LD-CDD precoding.

In the foregoing embodiment, the terminal obtains the quantity M of beamforming vectors needing to be reported by the terminal and the first reference signal that are sent by the base station; estimates the downlink channel states on the N dual-polarized antenna ports based on the first reference signal; selects the m first beamforming codewords based on the downlink channel states and the quantity M of beamforming vectors needing to be reported that is sent by the base station; and then feeds back the m selected first beamforming codewords and the ranks of the downlink channel states to the base station. The terminal selects the m first beamforming codewords based on the downlink channel states and the quantity M of beamforming vectors needing to be reported that is sent by the base station, and feeds back the m first beamforming codewords to the base station, so that the multipath characteristic of the channel can be fully used, and communication robustness can be maintained in the high-speed movement scenario based on the multipath diversity of the channel, thereby relatively flexibly implementing multi-user pairing and spatial multiplexing.

Figure 4:
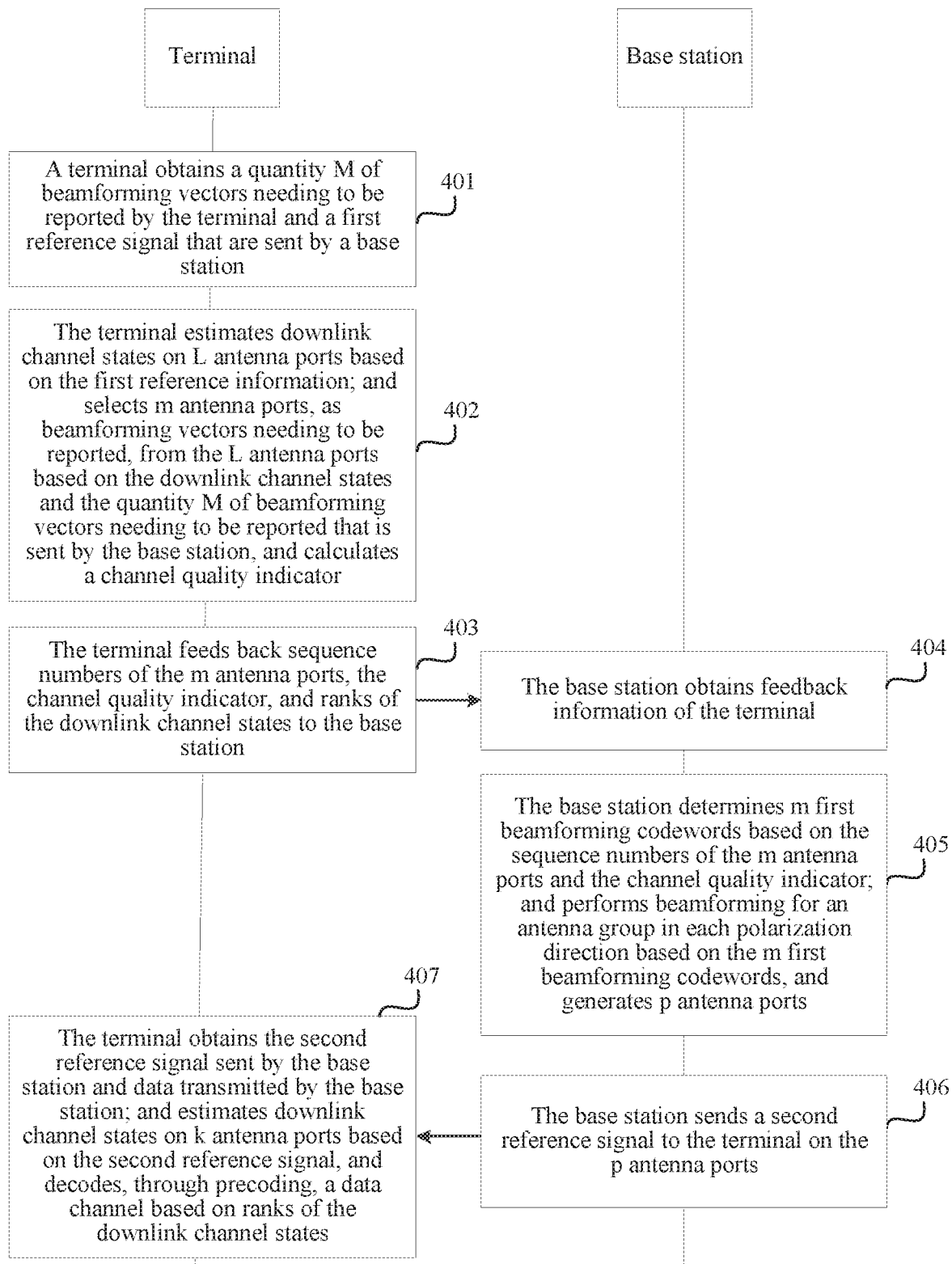
FIG. 4 is a schematic flowchart of a beamforming-based transmission method according to an embodiment of the present invention.

Based on a same technical idea, FIG. 4 shows a procedure of a beamforming-based transmission method according to an embodiment of the present invention. The procedure may be performed by a beamforming-based transmission apparatus.

As shown in FIG. 4, the procedure includes the following specific steps.

Step 401: A terminal obtains a quantity M of beamforming vectors needing to be reported by the terminal and a first reference signal that are sent by a base station.

Step 402: The terminal estimates downlink channel states on L antenna ports based on the first reference information; and selects m antenna ports, as beamforming vectors needing to be reported, from the L antenna ports based on the downlink channel states and the quantity M of beamforming vectors needing to be reported that is sent by the base station, and calculates a channel quality indicator.

Step 403: The terminal feeds back sequence numbers of the m antenna ports, the channel quality indicator, and ranks of the downlink channel states to the base station.

Step 404: The base station obtains feedback information of the terminal.

Step 405: The base station determines m first beamforming codewords based on the sequence numbers of the m antenna ports and the channel quality indicator; and performs beamforming for an antenna group in each polarization direction based on the m first beamforming codewords, and generates p antenna ports.

Step 406: The base station sends a second reference signal to the terminal on the p antenna ports.

Step 407: The terminal obtains the second reference signal sent by the base station and data transmitted by the base station; and estimates downlink channel states on k antenna ports based on the second reference signal, and decodes, through precoding, a data channel based on ranks of the downlink channel states.

In step 401, the first reference signal is sent by the base station on the L antenna ports, where M and L each are an integer greater than 0, and L>M.

Before step 401, the base station further needs to notify the terminal of the quantity M of beamforming needing to be reported by the terminal. The base station performs beamforming on N dual-polarized antenna ports, and generates the L antenna ports; and sends the first reference signal to the terminal on the L antenna ports, where N is a positive integer greater than 0. When calculating the quantity M of beamforming needing to be reported by the terminal, the base station may determine the quantity M based on a polarization direction of an antenna. For example, when different beamforming vectors are used in two polarization directions, the base station may determine that a minimum value of M is 2; or when a same beamforming vector is used in two polarization directions, the base station may determine that a minimum value of M is 1. The base station may send M to the terminal, so that the terminal reports the quantity of beamforming vectors. The quantity M of beamforming is sent by the base station by using a system message or a Radio Resource Control message.

In step 402, after the terminal obtains the first reference signal and the beamforming vectors needing to be reported that are sent by the base station, the terminal estimates the downlink channel states on the L antenna ports based on the first reference information, and then selects the m antenna ports, as the beamforming vectors needing to be reported, from the L antenna ports based on the downlink channel states and the quantity M of beamforming vectors needing to be reported that is sent by the base station, and calculates the channel quality indicator.

In a process of determining the quantity m of the antenna ports needing to be selected from the L antenna ports, the terminal may determine a value of m in the following manners:

Manner 1

The terminal determines the quantity M of beamforming vectors needing to be reported that is sent by the base station, as the quantity m of the antenna ports selected from the L antenna ports. To be specific, for any quantity of beamforming vectors to be reported by the terminal that is indicated by the base station, the terminal performs no processing, but directly reports, to the base station, the quantity of the antenna ports selected from the L antenna ports.

Manner 2

The terminal determines the quantity m of the selected antenna ports m based on the estimated downlink channel states and the quantity M of beamforming vectors needing to be reported that is sent by the base station, so that channel quality after precoding on the m antenna ports is optimal; and the terminal feeds back the value of m to the base station, where $0<m\leq M$. The terminal determines, based on the downlink channel states, a quantity of downlink channels having optimal channel quality, as the quantity m of the antenna ports needing to be selected, to improve beamforming-based transmission quality.

Based on the foregoing two manners of determining the value of m, when the terminal selects the m antenna ports, the terminal may directly select the m antenna ports from the L antenna ports, to be specific, randomly selects the m antenna ports from the L antenna ports. Alternatively, the terminal may perform linear weighting on the L antenna ports, to obtain the m antenna ports.

After step 403, namely, the terminal feeds back sequence numbers of the m antenna ports, the channel quality indicator, and ranks of the downlink channel states to the base station, in step 407, the terminal obtains the second reference signal sent by the base station and the data transmitted by the base station, where the data is sent by the base station on the k antenna ports; and then, the terminal estimates the downlink channel states on the k antenna ports based on the second reference signal, and decodes, through precoding, the data channel based on the ranks of the downlink channel states. The k antenna ports are k antenna ports generated after the base station performs beamforming for the antenna group in each polarization direction based on the m first beamforming codewords, and generates the p antenna ports; and encodes, through precoding, the data channel on the p antenna ports based on the ranks of the downlink channel states, where k is a positive integer greater than 0, and $0<k\leq p$.

To fully use a multipath characteristic of a channel during beamforming-based transmission, so that the terminal can flexibly perform diversity and multiplexing in a high-speed movement scenario, when decoding, through precoding, the data channel based on the ranks of the downlink channel states, the terminal may decode the data channel in the following several manners:

Manner 1

When the rank of the downlink channel state is 1, if a quantity of the k antenna ports is an even number, the terminal decodes the data channel through SFBC precoding; or when the rank of the downlink channel state is greater than 1, the terminal decodes the data channel through open-loop spatial multiplexing precoding, for example, the terminal uses LD-CDD precoding of Layer 1.

Manner 2

When the rank of the downlink channel state is 1, if a quantity of the k antenna ports is an odd number, the terminal decodes the data channel through large delay cyclic diversity precoding, for example, the terminal uses LD-CDD precoding of Layer 1; or when the rank of the downlink channel state is greater than 1, the terminal decodes the data channel through open-loop spatial multiplexing precoding, for example, the terminal uses LD-CDD precoding.

Manner 3

When the rank of the downlink channel state is 1, the terminal decodes the data channel through large delay cyclic diversity precoding, for example, the terminal uses LD-CDD precoding of Layer 1; or when the rank of the downlink channel state is greater than 1, the terminal decodes the data channel through open-loop spatial multiplexing precoding, for example, the terminal uses LD-CDD precoding.

In step 405, after the base station obtains the feedback information of the terminal, where the feedback information of the terminal includes the sequence numbers of the m antenna ports selected by the terminal and the channel quality indicator, the base station determines the m first beamforming codewords based on the sequence numbers of the m antenna ports and the channel quality indicator; and performs beamforming for the antenna group in each polarization direction based on the m first beamforming codewords, and generates the p antenna ports. The antennas in the antenna group in each polarization direction have the same polarization direction, and each group includes N/2 antenna ports. A value of p is related to the quantity m of first beamforming vectors that is fed back by the terminal. For example, when different beamforming vectors are used in two polarization directions of antennas, p=m, or when a same beamforming vector is used in two polarization directions of antennas, p=2 m. The base station sends the second reference signal to the terminal on the p antenna ports.

Optionally, the feedback information of the terminal further includes the rank of the downlink channel states, and the base station encodes, through precoding, the data channel on the p antenna ports based on the ranks of the downlink channel states, and generates the k antenna ports; and then the base station transmits the data to the terminal on the k antenna ports by using the encoded data channel.

Specifically, when encoding, through precoding, the data channel based on the ranks of the downlink channel states, the base station may encode the data channel in the following several manners:

Manner 1

When the rank of the downlink channel state is 1, if a quantity of the k antenna ports is an even number, the base station encodes the data channel through SFBC precoding; or when the rank of the downlink channel state is greater than 1, the base station encodes the data channel through open-loop spatial multiplexing precoding, for example, the base station uses LD-CDD precoding of Layer 1.

Manner 2

When the rank of the downlink channel state is 1, if a quantity of the k antenna ports is an odd number, the base station encodes the data channel through large delay cyclic diversity precoding, for example, the base station uses LD-CDD precoding of Layer 1; or when the rank of the downlink channel state is greater than 1, the base station encodes the data channel through open-loop spatial multiplexing precoding, for example, the base station uses LD-CDD precoding.

Manner 3

When the rank of the downlink channel state is 1, the base station encodes the data channel through large delay cyclic diversity precoding, for example, the base station uses LD-CDD precoding of Layer 1; or when the rank of the downlink channel state is greater than 1, the base station encodes the data channel through open-loop spatial multiplexing precoding, for example, the base station uses LD-CDD precoding.

In the foregoing embodiment, the terminal obtains the quantity M of beamforming vectors needing to be reported by the terminal and the first reference signal that are sent by the base station; estimates the downlink channel states on the L antenna ports based on the first reference information; and selects the m antenna ports, as the beamforming vectors needing to be reported, from the L antenna ports based on the downlink channel states and the quantity M of beamforming vectors needing to be reported that is sent by the base station, and calculates the channel quality indicator; and feeds back the sequence numbers of the m antenna ports, the channel quality indicator, and the ranks of the downlink channel states to the base station. The terminal selects the m antenna ports, as the beamforming vectors needing to be reported, based on the downlink channel states and the quantity M of beamforming vectors needing to be reported that is sent by the base station, and feeds back the m antenna ports to the base station, so that the multipath characteristic of the channel can be fully used, and communication robustness can be maintained in the high-speed movement scenario based on the multipath diversity of the channel, thereby relatively flexibly implementing multi-user pairing and spatial multiplexing.

To better explain the embodiments of the present invention, the beamforming-based transmission procedure is described below by using specific scenarios.

EMBODIMENT 1

Figure 5:
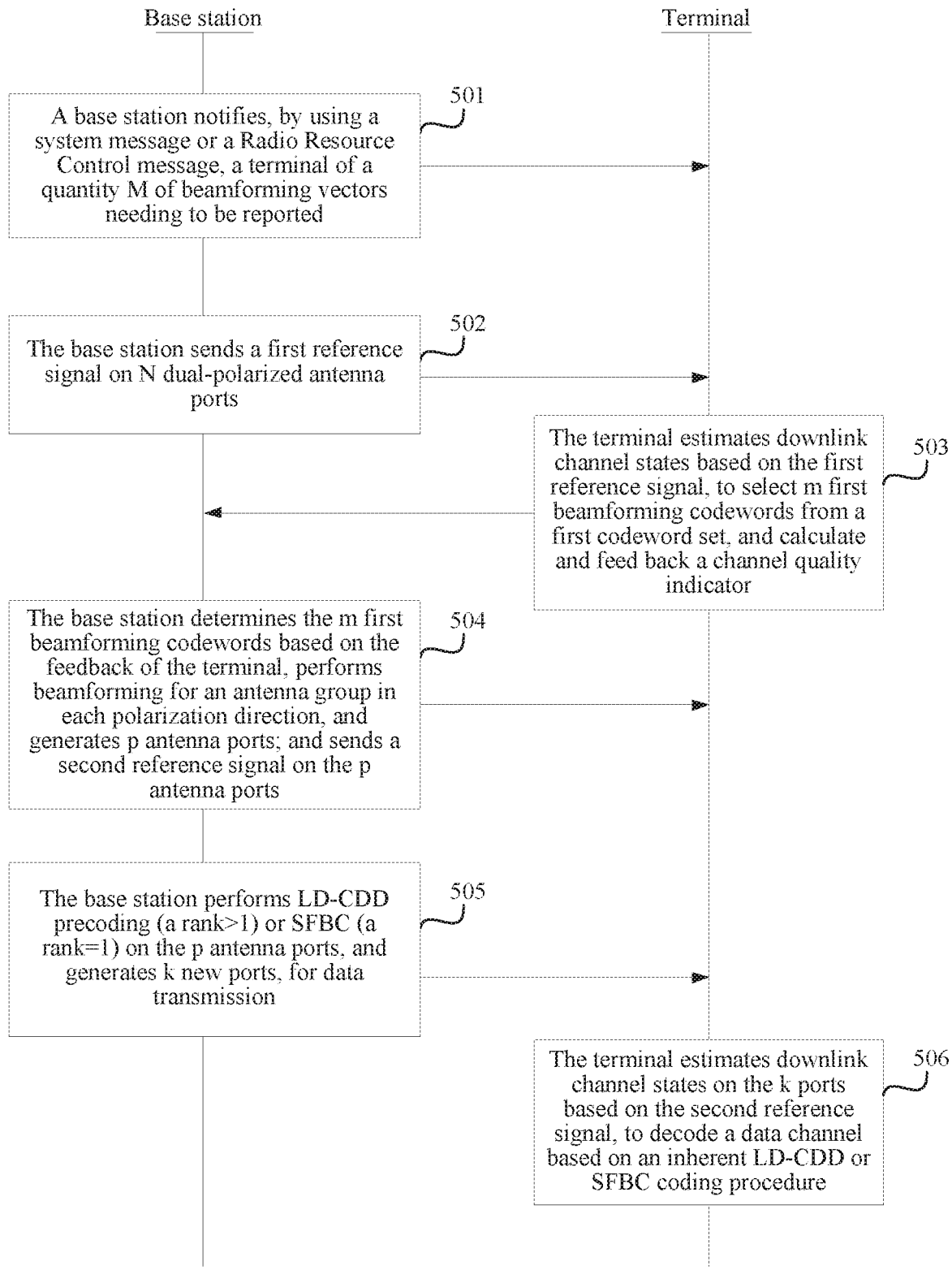
FIG. 5 is a schematic flowchart of a beamforming-based transmission method according to an embodiment of the present invention.

As shown in FIG. 5, the procedure includes the following specific steps.

Step 501: A base station notifies, by using a system message or a Radio Resource Control message, a terminal of a quantity M of beamforming vectors needing to be reported.

Step 502: The base station sends a first reference signal on N dual-polarized antenna ports.

Step 503: The terminal estimates downlink channel states based on the first reference signal, to select m first beamforming codewords from a first codeword set, and calculate and feed back a channel quality indicator.

Step 504: The base station determines the m first beamforming codewords based on the feedback of the terminal, performs beamforming for an antenna group in each polarization direction, and generates p antenna ports; and sends a second reference signal on the p antenna ports.

Step 505: The base station performs LD-CDD precoding (a rank>1) or SFBC (a rank=1) on the p antenna ports, and generates k new ports, for data transmission.

Step 506: The terminal estimates downlink channel states on the k ports based on the second reference signal, to decode a data channel based on an inherent LD-CDD or SFBC coding procedure.

A specific implementation of the foregoing procedure is already described in the foregoing embodiment, and details are not described again.

EMBODIMENT 2

Figure 6:
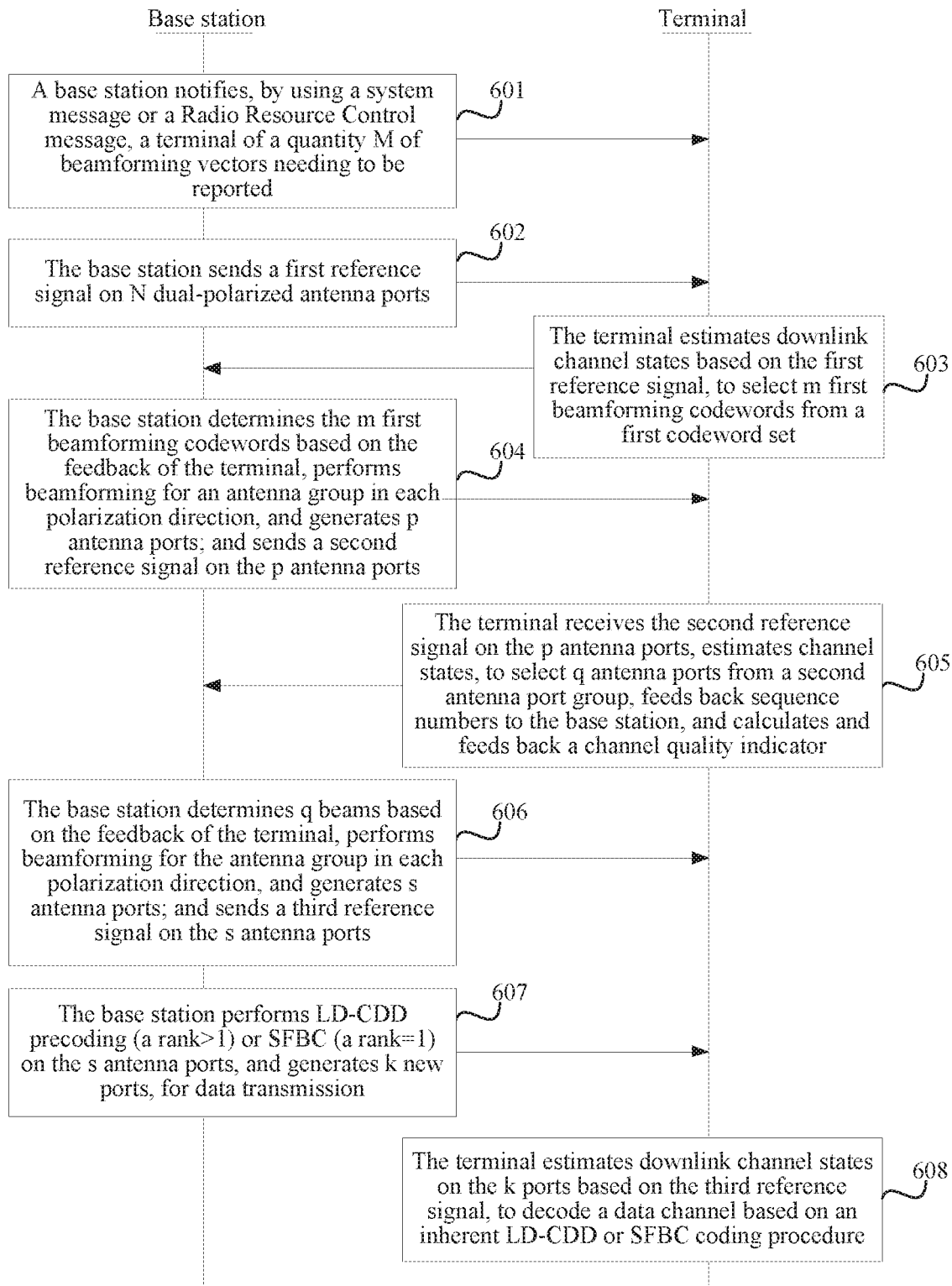
FIG. 6 is a schematic flowchart of a beamforming-based transmission method according to an embodiment of the present invention.

As shown in FIG. 6, the procedure includes the following specific steps.

Step 601: A base station notifies, by using a system message or a Radio Resource Control message, a terminal of a quantity M of beamforming vectors needing to be reported.

Step 602: The base station sends a first reference signal on N dual-polarized antenna ports.

Step 603: The terminal estimates downlink channel states based on the first reference signal, to select m first beamforming codewords from a first codeword set.

Step 604: The base station determines the m first beamforming codewords based on the feedback of the terminal, performs beamforming for an antenna group in each polarization direction, and generates p antenna ports; and sends a second reference signal on the p antenna ports.

Step 605: The terminal receives the second reference signal on the p antenna ports, estimates channel states, to select q antenna ports from a second antenna port group, feeds back sequence numbers to the base station, and calculates and feeds back a channel quality indicator.

Step 606: The base station determines q beams based on the feedback of the terminal, performs beamforming for the antenna group in each polarization direction, and generates s antenna ports; and sends a third reference signal on the s antenna ports.

Step 607: The base station performs LD-CDD precoding (a rank>1) or SFBC (a rank=1) on the s antenna ports, and generates k new ports, for data transmission.

Step 608: The terminal estimates downlink channel states on the k ports based on the third reference signal, to decode a data channel based on an inherent LD-CDD or SFBC coding procedure.

A specific implementation of the foregoing procedure is already described in the foregoing embodiment, and details are not described again.

EMBODIMENT 3

Figure 7:
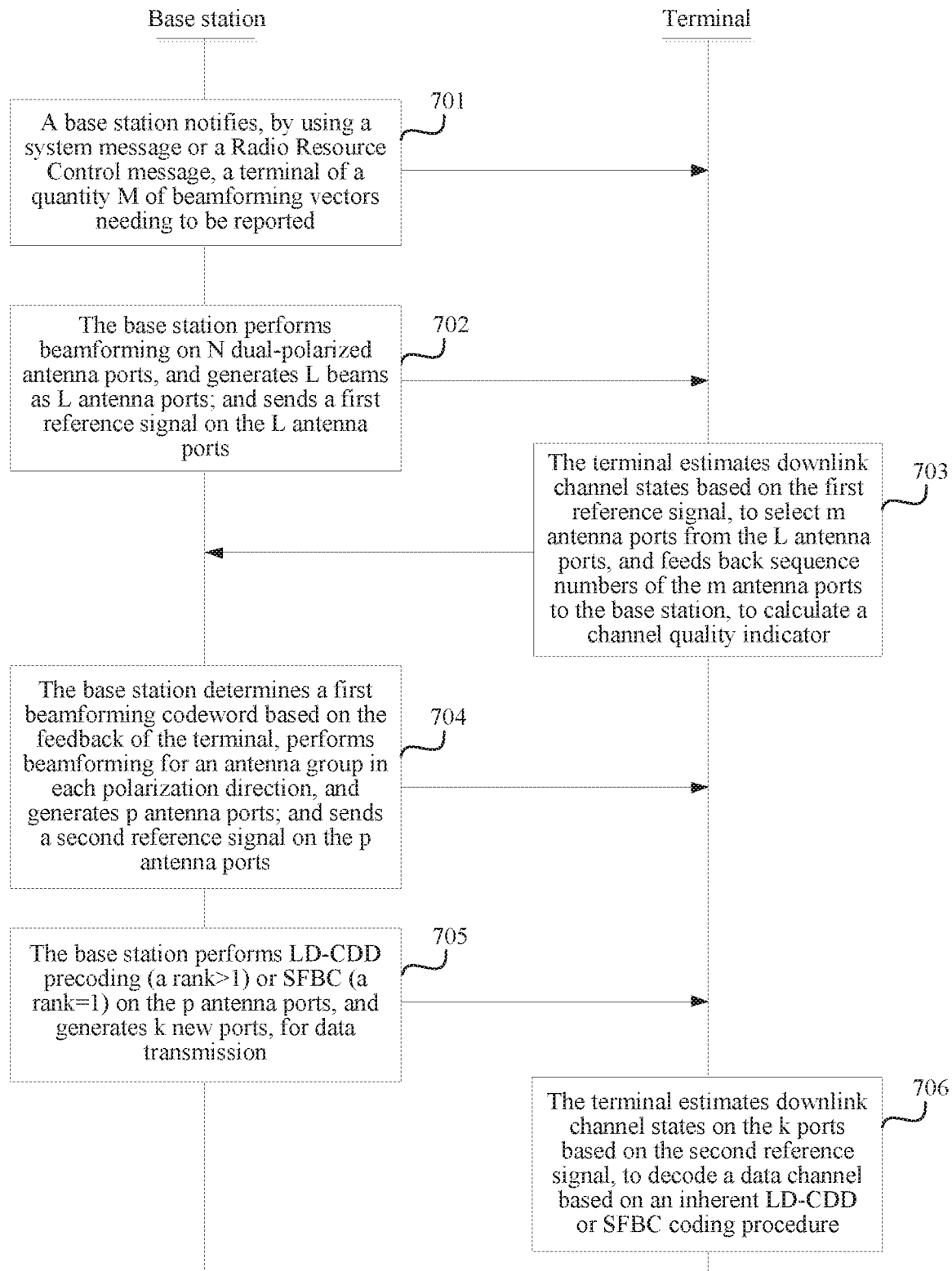
FIG. 7 is a schematic flowchart of a beamforming-based transmission method according to an embodiment of the present invention.

As shown in FIG. 7, the procedure includes the following specific steps.

Step 701: A base station notifies, by using a system message or a Radio Resource Control message, a terminal of a quantity M of beamforming vectors needing to be reported.

Step 702: The base station performs beamforming on N dual-polarized antenna ports, and generates L beams as L antenna ports; and sends a first reference signal on the L antenna ports.

Step 703: The terminal estimates downlink channel states based on the first reference signal, to select m antenna ports from the L antenna ports, and feeds back sequence numbers of the m antenna ports to the base station, to calculate a channel quality indicator.

Step 704: The base station determines a first beamforming codeword based on the feedback of the terminal, performs beamforming for an antenna group in each polarization direction, and generates p antenna ports; and sends a second reference signal on the p antenna ports.

Step 705: The base station performs LD-CDD precoding (a rank>1) or SFBC (a rank=1) on the p antenna ports, and generates k new ports, for data transmission.

Step 706: The terminal estimates downlink channel states on the k ports based on the second reference signal, to decode a data channel based on an inherent LD-CDD or SFBC coding procedure.

A specific implementation of the foregoing procedure is already described in the foregoing embodiment, and details are not described again.

Figure 8:
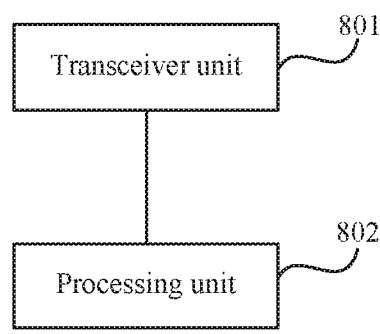
FIG. 8 is a schematic structural diagram of a beamforming-based transmission apparatus according to an embodiment of the present invention.

Based on a same technical idea, FIG. 8 shows a beamforming-based transmission apparatus according to an embodiment of the present invention. The apparatus may perform a beamforming procedure, and the apparatus may be located in a terminal or may be the terminal.

As shown in FIG. 8, the apparatus specifically includes:

a transceiver unit 801, configured to obtain a quantity M of beamforming vectors needing to be reported by the terminal and a first reference signal that are sent by a base station, where the first reference signal is sent by the base station on N dual-polarized antenna ports, and M and N each are an integer greater than 0; and a processing unit 802, configured to: estimate downlink channel states on the N dual-polarized antenna ports based on the first reference signal obtained by the transceiver unit 801; and select m first beamforming codewords based on the downlink channel states and the quantity M of beamforming vectors needing to be reported that is sent by the base station, where m≤M, where the transceiver unit 801 is further configured to feed back the m first beamforming codewords selected by the processing unit and ranks of the downlink channel states to the base station.

Optionally, the processing unit 802 is specifically configured to:

determine the quantity M of beamforming vectors needing to be reported that is sent by the base station, as the quantity m of the selected first beamforming codewords.

Optionally, the processing unit 802 is specifically configured to: determine the quantity m of the selected first beamforming codewords based on the downlink channel states and the quantity M of beamforming vectors needing to be reported that is sent by the base station, so that channel quality after joint precoding of m optimal beamforming vectors is optimal; and feed back a value of m to the base station by using the transceiver unit 801.

Optionally, the m selected first beamforming codewords are selected from a first codeword set, and the first codeword set is a codebook W1 having a rank of 1 in Long Term Evolution LTE Release 13 or is a set including new codebooks obtained by performing linear weighted summation on some codewords in a codebook W1 having a rank of 1 in LIE Release 13; or the first codeword set is a restricted set sent by the base station, and the restricted set is a set including codewords selected by the base station from a codebook W1 having a rank of 1 in LTE Release 13 or is a set including codewords selected by the base station from a set including new codebooks obtained by performing linear weighted summation on some codewords in a codebook W1 having a rank of 1 in LIE Release 13.

Optionally, the processing unit 802 is specifically configured to:

estimate a radiation angle of an antenna of the base station, to determine m beamforming directions with optimal channel quality; and determine directional angle values of the m beamforming directions with optimal channel quality, where a directional angle value is a directional angle or a trigonometric function value of a directional angle.

Optionally, the processing unit 802 is further configured to:

after the m selected first beamforming codewords and the ranks of the downlink channel states are fed back to the base station, calculate a channel quality indicator based on the selected first beamforming codewords and the ranks of the downlink channel states, and feed back the channel quality indicator to the base station by using the transceiver unit 801.

Optionally, the processing unit 802 is further configured to:

after feeding back the channel quality indicator to the base station, obtain, by using the transceiver unit 801, a second reference signal sent by the base station and data transmitted by the base station, where the data is transmitted by the base station on k antenna ports; and estimate downlink channel states on the k antenna ports based on the second reference signal, and decode, through precoding, a data channel based on ranks of the downlink channel states, where k is a positive integer greater than 0.

Optionally, the processing unit 802 is further configured to:

after the m selected first beamforming codewords and the ranks of the downlink channel states are fed back to the base station, obtain, by using the transceiver unit 801, a second reference signal sent by the base station, where the second reference signal is sent by the base station on p antenna ports; and estimate downlink channel states on the p antenna ports based on the second reference signal, select q antenna ports from the p antenna ports based on the downlink channel states, calculate a channel quality indicator, and feed back sequence numbers of the q antenna ports and the calculated channel quality indicator to the base station, where q≤p, and p is equal to m or p is equal to 2 m.

Optionally, the processing unit 802 is further configured to:

after feeding back the sequence numbers of the q antenna ports and the calculated channel quality indicator to the base station, obtain, by using the transceiver unit 801, a third reference signal sent by the base station and data transmitted by the base station, where the data is transmitted by the base station on k antenna ports; and estimate downlink channel states on the k antenna ports based on the third reference signal, and decode, through precoding, a data channel based on ranks of the downlink channel states.

Optionally, the processing unit 802 is specifically configured to:

when the rank of the downlink channel state is 1, if a quantity of the k antenna ports is an even number, decode the data channel through SFBC precoding; otherwise, decode the data channel through large delay cyclic diversity precoding; or when the rank of the downlink channel state is greater than 1, decode the data channel through open-loop spatial multiplexing precoding; or when the rank of the downlink channel state is 1, decode the data channel through large delay cyclic diversity precoding; or when the rank of the downlink channel state is greater than 1, decode the data channel through open-loop spatial multiplexing precoding.

Figure 9:
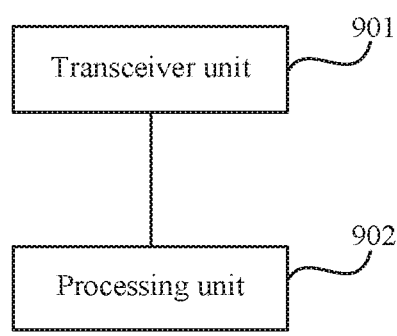
FIG. 9 is a schematic structural diagram of a beamforming-based transmission apparatus according to an embodiment of the present invention.

Based on a same technical idea, FIG. 9 shows a beamforming-based transmission apparatus according to an embodiment of the present invention. The apparatus may perform a beamforming procedure, and the apparatus may be located in a base station or may be the base station.

As shown in FIG. 9, the apparatus specifically includes:
a transceiver unit 901, configured to obtain first feedback information of a terminal, where the first feedback information of the terminal includes m first beamforming codewords selected by the terminal; and
a processing unit 902, configured to: determine m second beamforming codewords of the base station based on the m first beamforming codewords selected by the terminal; and perform beamforming for an antenna group in each polarization direction based on the m second beamforming codewords of the base station, and generate p antenna ports, where antennas in the antenna group in the polarization direction have a same polarization direction, and p is equal to m or p is equal to 2 m, where
the transceiver unit 901 is further configured to send a second reference signal to the terminal on the p antenna ports.

Optionally, the first feedback information of the terminal further includes a rank of a downlink channel state and a channel quality indicator calculated by the terminal; and
the processing unit 902 is further configured to:
after the second reference signal is sent to the terminal, encode, through precoding, a data channel on the p antenna ports based on the rank of the downlink channel state, and generate k antenna ports, where 0<k≤p; and
transmit, by using the transceiver unit 901, data to the terminal on the k antenna ports by using the encoded data channel.

Optionally, the first feedback information of the terminal further includes a rank of a downlink channel state; and
the processing unit 902 is further configured to:
after the second reference signal is sent to the terminal, obtain second feedback information of the terminal by using the transceiver unit 901, where the second feedback information includes sequence numbers of q antenna ports selected by the terminal and a calculated channel quality indicator; and
determine q beams based on the channel quality indicator and the sequence numbers of the q antenna ports, perform beamforming for the antenna group in each polarization direction based on the q beams, and generate s antenna ports; and send a third reference signal on the s antenna ports, where q≤p and s≤q.

Optionally, the processing unit 902 is further configured to:
after sending the third reference signal, encode, through precoding, the data channel on the s antenna ports based on the rank of the downlink channel state, and generate k antenna ports; and transmit, by using the transceiver unit 901, data to the terminal on the k antenna ports by using the encoded data channel.

Optionally, the processing unit 902 is specifically configured to:
when the rank of the downlink channel state is 1, if a quantity of the k antenna ports is an even number, encode the data channel through SFBC precoding; otherwise, encode the data channel through large delay cyclic diversity precoding; or when the rank of the downlink channel state is greater than 1, encode the data channel through open-loop spatial multiplexing precoding; or
when the rank of the downlink channel state is 1, encode the data channel through large delay cyclic diversity precoding; or when the rank of the downlink channel state is greater than 1, encode the data channel through open-loop spatial multiplexing precoding.

Optionally, the transceiver unit 901 is further configured to:
before obtaining the first feedback information of the terminal, notify the terminal of a quantity M of beamforming needing to be reported by the terminal; and
send a first reference signal to the terminal on N dual-polarized antenna ports, where N is a positive integer greater than 0.

Optionally, the transceiver unit 901 is further configured to:
before obtaining the first feedback information of the terminal, send a restricted set to the terminal, where the restricted set is a set including codewords selected from a codebook W1 having a rank of 1 in LTE Release 13 or is a set including codewords selected from a set including new codebooks obtained by performing linear weighted summation on some codewords in a codebook W1 having a rank of 1 in LIE Release 13.

Figure 10:
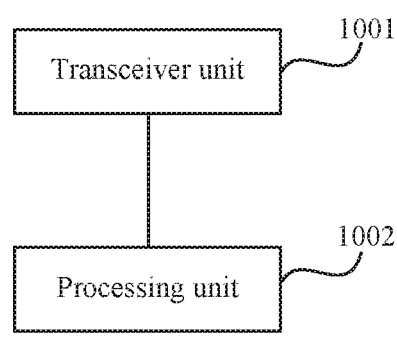
FIG. 10 is a schematic structural diagram of a beamforming-based transmission apparatus according to an embodiment of the present invention.

Based on a same technical idea, FIG. 10 shows a beamforming-based transmission apparatus according to an embodiment of the present invention. The apparatus may perform a beamforming procedure, and the apparatus may be located in a terminal or may be the terminal.

As shown in FIG. 10, the apparatus specifically includes:
a transceiver unit 1001, configured to obtain a quantity M of beamforming vectors needing to be reported by the terminal and a first reference signal that are sent by a base station, where the first reference signal is sent by the base station on L antenna ports, M and L each are an integer greater than 0, and L>M; and
a processing unit 1002, configured to: estimate downlink channel states on the L antenna ports based on the first reference signal; and select m antenna ports, as beamforming vectors needing to be reported, from the L antenna ports based on the downlink channel states and the quantity M of beamforming vectors needing to be reported that is sent by the base station, and calculate a channel quality indicator, where m≤M, where
the transceiver unit 1001 is further configured to feed back sequence numbers of the m antenna ports, the channel quality indicator, and ranks of the downlink channel states to the base station.

Optionally, the processing unit 1002 is further configured to:
after the sequence numbers of the m antenna ports, the channel quality indicator, and the ranks of the downlink channel states are fed back to the base station, obtain, by using the transceiver unit 1001, a second reference signal sent by the base station and data transmitted by the base station, where the data is transmitted by the base station on k antenna ports; and
estimate downlink channel states on the k antenna ports based on the second reference signal, and decode, through precoding, a data channel based on ranks of the downlink channel states, where k is a positive integer greater than 0.

Optionally, the processing unit 1002 is specifically configured to:

when the rank of the downlink channel state is 1, if a quantity of the k antenna ports is an even number, decode the data channel through SFBC precoding; otherwise, decode the data channel through large delay cyclic diversity precoding; or when the rank of the downlink channel state is greater than 1, decode the data channel through open-loop spatial multiplexing precoding; or when the rank of the downlink channel state is 1, decode the data channel through large delay cyclic diversity precoding; or when the rank of the downlink channel state is greater than 1, decode the data channel through open-loop spatial multiplexing precoding.

Optionally, the processing unit 1002 is specifically configured to:

determine the quantity M of beamforming vectors needing to be reported that is sent by the base station, as the quantity m of the antenna ports selected from the L antenna ports.

Optionally, the processing unit 1002 is specifically configured to:

determine the quantity m of the selected antenna ports based on the downlink channel states and the quantity M of beamforming vectors needing to be reported that is sent by the base station, so that channel quality after joint precoding of m optimal beamforming vectors is optimal; and feed back a selected value of m to the base station by using the transceiver unit 1001.

Optionally, the processing unit 1002 is specifically configured to:

directly select the m antenna ports from the L antenna ports; or perform linear weighting on the L antenna ports, to obtain the m antenna ports.

Figure 11:
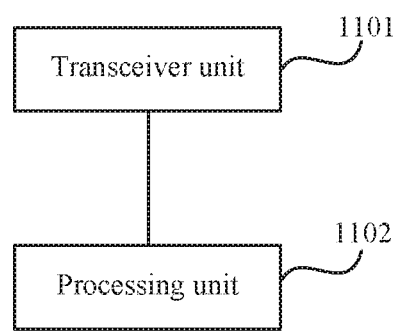
FIG. 11 is a schematic structural diagram of a beamforming-based transmission apparatus according to an embodiment of the present invention.

Based on a same technical idea, FIG. 11 shows a beamforming-based transmission apparatus according to an embodiment of the present invention. The apparatus may perform a beamforming procedure, and the apparatus may he located in a base station or may be the base station.

As shown in FIG. 11, the apparatus specifically includes:

a transceiver unit 1101, configured to obtain feedback information of a terminal, where the feedback information of the terminal includes sequence numbers of m antenna ports selected by the terminal and a channel quality indicator; and a processing unit 1102, configured to: determine m first beamforming codewords based on the sequence numbers of the m antenna ports and the channel quality indicator; and perform beamforming for an antenna group in each polarization direction based on the m first beamforming codewords, and generate p antenna ports, where antennas in the antenna group in the polarization direction have a same polarization direction, where the transceiver unit 1101 is further configured to send a second reference signal to the terminal on the p antenna ports, where p is equal to m or p is equal to 2 m.

Optionally, the processing unit 1102 is further configured to:

the feedback information of the terminal further includes a rank of a downlink channel state; and after the second reference signal is sent to the terminal on the p antenna ports, encode, through precoding, a data channel on the p antenna ports based on the rank of the downlink channel state, and generate k antenna ports; and transmit, by using the transceiver unit 1101, data to the terminal on the k antenna ports by using the encoded data channel, where 0<k≤p.

Optionally, the processing unit 1102 is specifically configured to:

when the rank of the downlink channel state is 1, if a quantity of the k antenna ports is an even number, encode the data channel through SFBC precoding; otherwise, encode the data channel through large delay cyclic diversity precoding; or when the rank of the downlink channel state is greater than 1, encode the data channel through open-loop spatial multiplexing precoding; or when the rank of the downlink channel state is 1, encode the data channel through large delay cyclic diversity precoding; or when the rank of the downlink channel state is greater than 1, encode the data channel through open-loop spatial multiplexing precoding.

Optionally, the transceiver unit 1101 is further configured to:

before obtaining the feedback information of the terminal, notify the terminal of a quantity M of beamforming needing to be reported by the terminal; and perform beamforming on N dual-polarized antenna ports, and generate L antenna ports; and send a first reference signal to the terminal on the L antenna ports, where N is a positive integer greater than 0.

Figure 12:
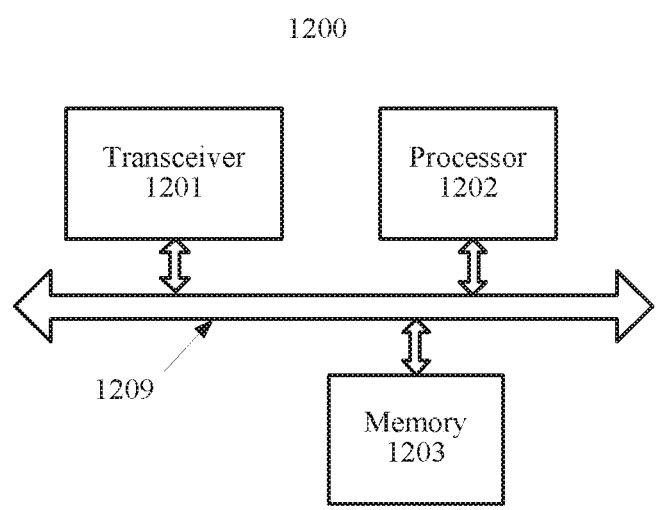
FIG. 12 is a schematic structural diagram of a beamforming-based transmission device according to an embodiment of the present invention.

Based on a same idea, FIG. 12 shows a beamforming-based transmission device 1200 according to an embodiment of the present invention. The beamforming-based transmission device 1200 may perform a step or a function performed by the receiver in the foregoing embodiments. The beamforming-based transmission device 1200 may include a transceiver 1201, a processor 1202, and a memory 1203. The processor 1202 is configured to control an operation of the beamforming-based transmission device 1200. The memory 1203 may include a read-only memory and a random access memory, and store an instruction and data that can be executed by the processor 1202. A part of the memory 1203 may further include a non-volatile random access memory (NVRAM). Components such as the transceiver 1201, the processor 1202, and the memory 1203 are connected by using a bus 1209. The bus 1209 may further include a power supply bus, a control bus, and a state signal bus in addition to a data bus. However, for clear description, various buses are marked as the bus 1209 in the figure.

The beamforming-based transmission method disclosed in the embodiments of the present invention is applicable to the processor 1202, or is implemented by the processor 1202. During implementation, steps in a processing procedure may be completed by using an integrated logical circuit of hardware in the processor 1202 or an instruction in a form of software in the processor 1202. The processor 1202 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of the present invention. The general-purpose processor may be a microprocessor, any conventional processor, or the like. The steps of the method disclosed with reference to the embodiments of the present invention may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1203. The processor 1202 reads information stored in the memory 1203, and performs the steps of the beamforming-based transmission method in combination with hardware in the processor 1202.

The transceiver 1201 obtains a quantity M of beamforming vectors needing to be reported by a terminal and a first reference signal that are sent by a base station, where the first reference signal is sent by the base station on N dual-polarized antenna ports, and M and N each are an integer greater than 0.

The processor 1202 estimates downlink channel states on the N dual-polarized antenna ports based on the first reference signal obtained by the transceiver 1201; and selects m first beamforming codewords based on the downlink channel states and the quantity M of beamforming vectors needing to be reported that is sent by the base station, where m≤M.

The transceiver 1201 feeds hack the m first beamforming codewords selected by the processor 1202 and ranks of the downlink channel states to the base station.

Optionally, the processor 1202 determines the quantity M of beamforming vectors needing to be reported that is sent by the base station, as the quantity m of the selected first beamforming codewords.

Optionally, the processor 1202 determines the quantity m of the selected first beamforming codewords based on the downlink channel states and the quantity M of beamforming vectors needing to be reported that is sent by the base station, so that channel quality after joint precoding of m optimal beamforming vectors is optimal; and the processor 1202 feeds back a value of m to the base station by using the transceiver 1201.

Optionally, the m selected first beamforming codewords are selected from a first codeword set, and the first codeword set is a codebook W1 having a rank of 1 in Long Term Evolution LTE Release 13 or is a set including new codebooks obtained by performing linear weighted summation on some codewords in a codebook W1 having a rank of 1 in LTE Release 13; or the first codeword set is a restricted set sent by the base station, and the restricted set is a set including codewords selected by the base station from a codebook W1 having a rank of 1 in LTE Release 13 or is a set including codewords selected by the base station from a set including new codebooks obtained by performing linear weighted summation on some codewords in a codebook W1 having a rank of 1 in LIT Release 13.

Optionally, the processor 1202 estimates a radiation angle of an antenna of the base station, to determine m beamforming directions with optimal channel quality; and determines directional angle values of the m beamforming directions with optimal channel quality, where a directional angle value is a directional angle or a trigonometric function value of a directional angle.

Optionally, after the m selected first beamforming codewords and the ranks of the downlink channel states are fed back to the base station, the processor 1202 calculates a channel quality indicator based on the selected first beamforming codewords and the ranks of the downlink channel states, and feeds back the channel quality indicator to the base station by using the transceiver 1201.

Optionally, after feeding back the channel quality indicator to the base station, the processor 1202 obtains, by using the transceiver 1201, a second reference signal sent by the base station and data transmitted by the base station, where the data is transmitted by the base station on k antenna ports; and estimates downlink channel states on the k antenna ports based on the second reference signal, and decodes, through precoding, a data channel based on ranks of the downlink channel states, where k is a positive integer greater than 0.

Optionally, after the m selected first beamforming codewords and the ranks of the downlink channel states are fed back to the base station, the processor 1202 obtains, by using the transceiver 1201, a second reference signal sent by the base station, where the second reference signal is sent by the base station on p antenna ports; and the processor 1202 estimates downlink channel states on the p antenna ports based on the second reference signal, selects q antenna ports from the p antenna ports based on the downlink channel states, calculates a channel quality indicator, and feeds back sequence numbers of the q antenna ports and the calculated channel quality indicator to the base station, where q≤p, and p is equal to m or p is equal to 2 m.

Optionally, after feeding back the sequence numbers of the q antenna ports and the calculated channel quality indicator to the base station, the processor 1202 obtains, by using the transceiver 1201, a third reference signal sent by the base station and data transmitted by the base station, where the data is transmitted by the base station on k antenna ports; and the processor 1202 estimates downlink channel states on the k antenna ports based on the third reference signal, and decodes, through precoding, a data channel based on ranks of the downlink channel states.

Optionally, when the rank of the downlink channel state is 1, if a quantity of the k antenna ports is an even number, the processor 1202 decodes the data channel through SFBC precoding; otherwise, the processor 1202 decodes the data channel through large delay cyclic diversity precoding; or when the rank of the downlink channel state is greater than 1, the processor 1202 decodes the data channel through open-loop spatial multiplexing precoding; or When the rank of the downlink channel state is 1, the processor 1202 decodes the data channel through large delay cyclic diversity precoding; or when the rank of the downlink channel state is greater than 1, the processor 1202 decodes the data channel through open-loop spatial multiplexing precoding.

Figure 13:
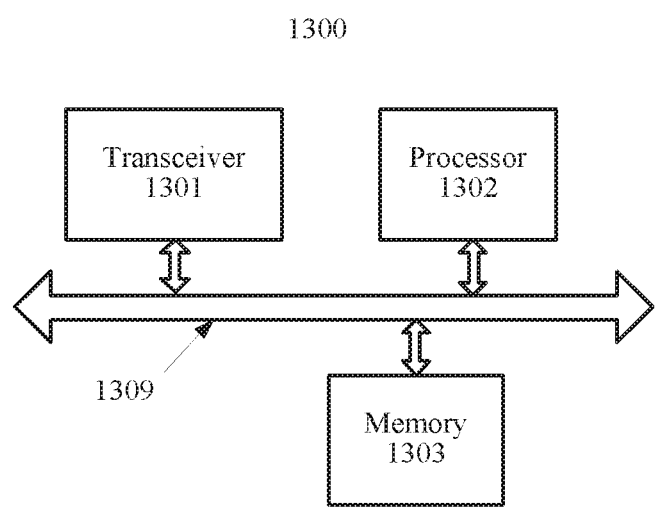
FIG. 13 is a schematic structural diagram of a beamforming-based transmission device according to an embodiment of the present invention.

Based on a same idea, FIG. 13 shows a beamforming-based transmission device 1300 according to an embodiment of the present invention. The beamforming-based transmission device 1300 may perform a step or a function performed by the receiver in the foregoing embodiments.

The beamforming-based transmission device 1300 may include a transceiver 1301, a processor 1302, and a memory 1303. The processor 1302 is configured to control an operation of the beamforming-based transmission device 1300. The memory 1303 may include a read-only memory and a random access memory, and store an instruction and data that can be executed by the processor 1302. A part of the memory 1303 may further include a non-volatile random access memory (NVRAM). Components such as the transceiver 1301, the processor 1302, and the memory 1303 are connected by using a bus 1309. The bus 1309 may further include a power supply bus, a control bus, and a state signal bus in addition to a data bus. However, for clear description, various buses are marked as the bus 1309 in the figure.

The beamforming-based transmission method disclosed in the embodiments of the present invention is applicable to the processor 1302, or is implemented by the processor 1302. During implementation, steps in a processing procedure may be completed by using an integrated logical circuit of hardware in the processor 1302 or an instruction in a form of software in the processor 1302. The processor 1302 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of the present invention. The general-purpose processor may be a microprocessor, any conventional processor, or the like. The steps of the method disclosed with reference to the embodiments of the present invention may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1303. The processor 1302 reads information stored in the memory 1303, and performs the steps of the beamforming-based transmission method in combination with hardware in the processor 1302.

The transceiver 1301 obtains first feedback information of a terminal, where the first feedback information of the terminal includes m first beamforming codewords selected by the terminal.

The processor 1302 determines m second beamforming codewords of a base station based on the m first beamforming codewords selected by the terminal; and performs beamforming for an antenna group in each polarization direction based on the m second beamforming codewords of the base station, and generates p antenna ports, where antennas in the antenna group in the polarization direction have a same polarization direction, and p is equal to m or p is equal to 2 m.

The transceiver 1301 sends a second reference signal to the terminal on the p antenna ports.

Optionally, the first feedback information of the terminal further includes a rank of a downlink channel state and a channel quality indicator calculated by the terminal; and
  after the second reference signal is sent to the terminal, the processor 1302 encodes, through precoding, a data channel on the p antenna ports based on the rank of the downlink channel state, and generates k antenna ports, where 0<k≤p; and transmits, by using the transceiver 1301, data to the terminal on the k antenna ports by using the encoded data channel.

Optionally, the first feedback information of the terminal further includes a rank of a downlink channel state; and
  after the second reference signal is sent to the terminal, the processor 1302 obtains second feedback information of the terminal by using the transceiver 1301, where the second feedback information includes sequence numbers of q antenna ports selected by the terminal and a calculated channel quality indicator; and
  the processor 1302 determines q beams based on the channel quality indicator and the sequence numbers of the q antenna ports, performs beamforming for the antenna group in each polarization direction based on the q beams, and generates s antenna ports; and sends a third reference signal on the s antenna ports by using the transceiver 1301, where q≤p, and s≤q.

Optionally, after sending the third reference signal, the processor 1302 encodes, through precoding, the data channel on the s antenna ports based on the rank of the downlink channel state, and generates k antenna ports; and transmits, by using the transceiver 1301, data to the terminal on the k antenna ports by using the encoded data channel.

Optionally, when the rank of the downlink channel state is 1, if a quantity of the k antenna ports is an even number, the processor 1302 encodes the data channel through SFBC precoding; otherwise, the processor 1302 encodes the data channel through large delay cyclic diversity precoding; or when the rank of the downlink channel state is greater than 1, the processor 1302 encodes the data channel through open-loop spatial multiplexing precoding; or
  when the rank of the downlink channel state is 1, the processor 1302 encodes the data channel through large delay cyclic diversity precoding; or when the rank of the downlink channel state is greater than 1, the processor 1302 encodes the data channel through open-loop spatial multiplexing precoding.

Optionally, before obtaining the first feedback information of the terminal, the transceiver 1301 notifies the terminal of a quantity M of beamforming needing to be reported by the terminal; and sends a first reference signal to the terminal on N dual-polarized antenna ports, where N is a positive integer greater than 0.

Optionally, before obtaining the first feedback information of the terminal, the transceiver 1301 sends a restricted set to the terminal, where the restricted set is a set including codewords selected from a codebook W1 having a rank of 1 in LTE Release 13 or is a set including codewords selected from a set including new codebooks obtained by performing linear weighted summation on some codewords in a codebook W1 having a rank of 1 in LTE Release 13.

Figure 14:
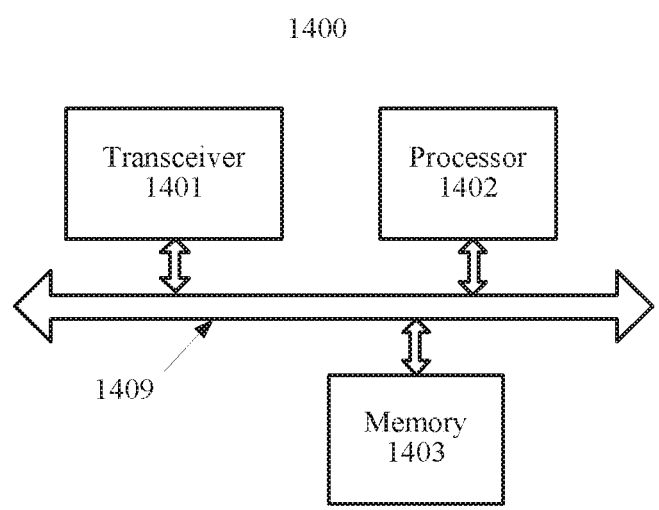
FIG. 14 is a schematic structural diagram of a beamforming-based transmission device according to an embodiment of the present invention.

Based on a same idea, FIG. 14 shows a beamforming-based transmission device 1400 according to an embodiment of the present invention. The beamforming-based transmission device 1400 may perform a step or a function performed by the receiver in the foregoing embodiments.

The beamforming-based transmission device 1400 may include a transceiver 1401, a processor 1402, and a memory 1403. The processor 1402 is configured to control an operation of the beamforming-based transmission device 1400. The memory 1403 may include a read-only memory and a random access memory, and store an instruction and data that can be executed by the processor 1402. A part of the memory 1403 may further include a non-volatile random access memory (NVRAM) Components such as the transceiver 1401, the processor 1402, and the memory 1403 are connected by using a bus 1409. The bus 1409 may further include a power supply bus, a control bus, and a state signal bus in addition to a data bus. However, for clear description, various buses are marked as the bus 1409 in the figure.

The beamforming-based transmission method disclosed in the embodiments of the present invention is applicable to the processor 1402, or is implemented by the processor 1402. During implementation, steps in a processing procedure may be completed by using an integrated logical circuit of hardware in the processor 1402 or an instruction in a form of software in the processor 1401. The processor 1402 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of the present invention. The general-purpose processor may be a microprocessor, any conventional processor, or the like. The steps of the method disclosed with reference to the embodiments of the present invention may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1403. The processor 1402 reads information stored in the memory 1403, and performs the steps of the beamforming-based transmission method in combination with hardware in the processor 1402.

The transceiver 1401 obtains a quantity M of beamforming vectors needing to be reported by a terminal and a first reference signal that are sent by a base station, where the first reference signal is sent by the base station on L antenna ports, M and L each are an integer greater than 0, and L>M.

The processor 1402 estimates downlink channel states on the L antenna ports based on the first reference signal; and selects m antenna ports, as beamforming vectors needing to be reported, from the L antenna ports based on the downlink channel states and the quantity M of beamforming vectors needing to be reported that is sent by the base station, and calculates a channel quality indicator, where m≤M.

The transceiver 1401 is further configured to feed back sequence numbers of the m antenna ports, the channel quality indicator, and ranks of the downlink channel states to the base station.

Optionally, after the sequence numbers of the m antenna ports, the channel quality indicator, and the ranks of the downlink channel states are fed back to the base station, the processor 1402 obtains, by using the transceiver 1401, a second reference signal sent by the base station and data transmitted by the base station, where the data is transmitted by the base station on k antenna ports; and the processor 1402 estimates downlink channel states on the k antenna ports based on the second reference signal, and decodes, through precoding, a data channel based on ranks of the downlink channel states, where k is a positive integer greater than 0.

Optionally, when the rank of the downlink channel state is 1, if a quantity of the k antenna ports is an even number, the processor 1402 decodes the data channel through SFBC precoding; otherwise, the processor 1402 decodes the data channel through large delay cyclic diversity precoding; or when the rank of the downlink channel state is greater than 1, the processor 1402 decodes the data channel through open-loop spatial multiplexing precoding; or when the rank of the downlink channel state is 1, the processor 1402 decodes the data channel through large delay cyclic diversity precoding; or when the rank of the downlink channel state is greater than 1, the processor 1402 decodes the data channel through open-loop spatial multiplexing precoding.

Optionally, the processor 1402 determines the quantity M of beamforming vectors needing to be reported that is sent by the base station, as the quantity m of the antenna ports selected from the L antenna ports.

Optionally, the processor 1402 determines the quantity m of the selected antenna ports based on the downlink channel states and the quantity M of beamforming vectors needing to be reported that is sent by the base station, so that channel quality after joint precoding of m optimal beamforming vectors is optimal; and the processor 1402 feeds back a selected value of m to the base station by using the transceiver 1401.

Optionally, the processor 1402 directly selects the m antenna ports from the L antenna ports; or the processor 1402 performs linear weighting on the L antenna ports, to obtain the m antenna ports.

Figure 15:
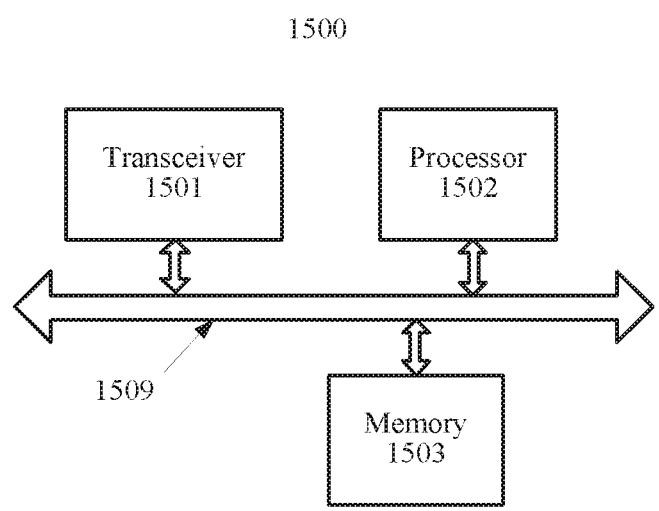
FIG. 15 is a schematic structural diagram of a beamforming-based transmission device according to an embodiment of the present invention.

Based on a same idea, FIG. 15 shows a beamforming-based transmission device 1500 according to an embodiment of the present invention. The beamforming-based transmission device 1500 may perform a step or a function performed by the receiver in the foregoing embodiments. The beamforming-based transmission device 1500 may include a transceiver 1501, a processor 1502, and a memory 1503. The processor 1502 is configured to control an operation of the beamforming-based transmission device 1500. The memory 1503 may include a read-only memory and a random access memory, and store an instruction and data that can be executed by the processor 1502. A part of the memory 1503 may further include a non-volatile random access memory (NVRAM). Components such as the transceiver 1501, the processor 1502, and the memory 1503 are connected by using a bus 1509. The bus 1509 may further include a power supply bus, a control bus, and a state signal bus in addition to a data bus. However, for clear description, various buses are marked as the bus 1509 in the figure.

The beamforming-based transmission method disclosed in the embodiments of the present invention is applicable to the processor 1502, or is implemented by the processor 1502. During implementation, steps in a processing procedure may be completed by using an integrated logical circuit of hardware in the processor 1502 or an instruction in a form of software in the processor 1502. The processor 1502 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in the embodiments of the present invention. The general-purpose processor may be a microprocessor, any conventional processor, or the like. The steps of the method disclosed with reference to the embodiments of the present invention may be directly performed and completed by using a hardware processor, or may be performed and completed by using a combination of hardware and software modules in the processor. The software module may be located in a mature storage medium in the art, such as a random access memory, a flash memory, a read-only memory, a programmable read-only memory, an electrically-erasable programmable memory, or a register. The storage medium is located in the memory 1503. The processor 1502 reads information stored in the memory 1503, and performs the steps of the beamforming-based transmission method in combination with hardware in the processor 1502.

The transceiver 1501 obtains feedback information of a terminal, where the feedback information of the terminal includes sequence numbers of m antenna ports selected by the terminal and a channel quality indicator.

The processor 1502 determines m first beamforming codewords based on the sequence numbers of the m antenna ports and the channel quality indicator; and performs beamforming for an antenna group in each polarization direction based on the m first beamforming codewords, and generates p antenna ports, where antennas in the antenna group in the polarization direction have a same polarization direction.

The transceiver 1501 is further configured to send a second reference signal to the terminal on the p antenna ports, where p is equal to m or p is equal to 2 m.

Optionally, the feedback information of the terminal further includes a rank of a downlink channel state; and after the second reference signal is sent to the terminal on the p antenna ports, the processor 1502 encodes, through precoding, a data channel on the p antenna ports based on the rank of the downlink channel state, and generates k antenna ports; and the processor 1502 transmits, by using the transceiver 1501, data to the terminal on the k antenna ports by using the encoded data channel, where 0<k≤p.

Optionally, when the rank of the downlink channel state is 1, if a quantity of the k antenna ports is an even number, the processor 1502 encodes the data channel through SFBC precoding; otherwise, the processor 1502 encodes the data channel through large delay cyclic diversity precoding; or when the rank of the downlink channel state is greater than 1, the processor 1502 encodes the data channel through open-loop spatial multiplexing precoding; or when the rank of the downlink channel state is 1, the processor 1502 encodes the data channel through large delay cyclic diversity precoding; or when the rank of the downlink channel state is greater than 1, the processor 1502 encodes the data channel through open-loop spatial multiplexing precoding.

Optionally, before obtaining the feedback information of the terminal, the transceiver 1501 notifies the terminal of a quantity M of beamforming needing to be reported by the terminal; and the transceiver 1501 performs beamforming on N dual-polarized antenna ports, and generates L antenna ports; and sends a first reference signal to the terminal on the L antenna ports, where N is a positive integer greater than 0.

Persons skilled in the art should understand that the embodiments of the present invention may be provided as a method or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the scope of the present invention. The present invention is intended to cover these modifications and variations provided that they fall within the protection scope defined by the following claims and their equivalent technologies.

What is claimed is:

1. A beamforming-based transmission method by a terminal, the method comprising:

obtaining, from a base station, a first reference signal and a message indicating a quantity M of beamforming vectors needing to be reported by the terminal, wherein the first reference signal is received from N dual-polarized antenna ports of the base station, and wherein M and N each are an integer greater than zero;

estimating downlink channel states on the N dual-polarized antenna ports based on the first reference signal;

selecting m first beamforming codewords based on the downlink channel states and the quantity M of beamforming vectors needing to he reported, wherein m≤M; and feeding back to the base station the m first beamforming codewords and ranks of the downlink channel states.

2. The method of claim 1, further comprising determining a quantity m of the m first beamforming codewords by determining the quantity M of beamforming vectors needing to he reported as the quantity m of the selected m first beamforming codewords.

3. The method of claim 2, wherein after the feeding back, by the terminal, the m beamforming codewords and ranks of the downlink channel states to the base station, the method further comprises:

calculating, by the terminal, a channel quality indicator based on the m first beamforming codewords and the ranks of the downlink channel states; and feeding back the channel quality indicator to the base station.

4. The method of claim 3, wherein after the feeding back, by the terminal, the channel quality indicator to the base station, the method further comprises:

obtaining, by the terminal, from the base station, a second reference signal and data, wherein the data is received from k antenna ports of the base station, and wherein k is a positive integer greater than zero;

estimating, by the terminal, downlink channel states on the k antenna ports based on the second reference signal; and decoding, through precoding, a data channel based on ranks of the downlink channel states.

5. The method of claim 2, wherein after the feeding back, by the terminal, the m first beamforming codewords and ranks of the downlink channel states to the base station, the method further comprises:

obtaining, by the terminal, a second reference signal from p antenna ports of the base station;

estimating, by the terminal, downlink channel states on the p antenna ports based on the second reference signal;

selecting q antenna ports from the p antenna ports based on the downlink channel states:

calculating a channel quality indicator; and feeding hack sequence numbers of the q antenna ports and the channel quality indicator to the base station, wherein q≤p, and p is equal to m or p is equal to 2 m.

6. The method of claim 5, wherein after the feeding back, by the terminal, sequence numbers of the q antenna ports and the channel quality indicator to the base station, the method further comprises:

obtaining, by the terminal from the base station, a third reference signal and data, wherein the data is received from the base station on k antenna ports;

estimating, by the terminal, downlink channel states on the k antenna ports based on the third reference signal; and decoding, through precoding, a data channel based on ranks of the downlink channel states.

7. The method of claim 1, wherein the terminal determines a quantity m of the m first beamforming codewords at least in part by:

determining, by the terminal, the quantity m of the m first beamforming codewords based on the downlink channel states and the quantity M of beamforming, vectors needing to be reported so that channel quality after joint precoding of m optimal beamforming vectors is optimal; and feeding back, by the terminal, a value of m to the base station.

8. A beamforming-based transmission method by a terminal, the method comprising:

obtaining, from a base station, a first reference signal and a message indicating a quantity M beamforming vectors needing to be reported by the terminal, wherein the first reference signal is received from L antenna ports the base station, wherein M and L each are an integer greater than zero, and wherein; L>M;

estimating downlink channel states on the L antenna ports based on the first reference signal;

selecting m antenna ports from the L antenna ports as beamforming vectors needing to be reported based on the downlink channel states and the quantity M of beamforming vectors needing to be reported;

calculating a channel quality indicator, wherein m≤M; and feeding back to the base station sequence numbers of the m antenna ports, the channel quality indicator, and ranks of the downlink channel states.

9. The method of claim 8, wherein after the feeding back, by the terminal, the sequence numbers of the m antenna ports, the channel quality indicator, and the ranks of the downlink channel states to the base station, the method further comprises:

obtaining, by the terminal from the base station, a second reference signal and data, wherein the data is received from k antenna ports of the base station;

estimating, by the terminal, downlink channel states on the k antenna ports based on the second reference signal; and decoding, through precoding, a data channel based on ranks of the downlink channel states, wherein k is a positive integer greater than zero.

10. The method of claim 9, wherein the terminal determines a quantity m of the m antenna ports selected from the L antenna ports by determining the quantity M of beamforming vectors needing to be reported as the quantity m of the antenna ports selected from the L antenna ports.

11. The method of claim 8, wherein the terminal determines a quantity m of the m antenna ports selected from the L antenna ports at least in part by:

determining, by the terminal, the quantity m of the m antenna ports based on the downlink channel states and the quantity M of beamforming vectors needing to be reported so that channel quality after joint precoding of m optimal beamforming vectors is optimal; and feeding back, by the terminal, a selected value of m to the base station.

12. A beamforming-based transmission device comprising:

a memory storing;

a transceiver configured to obtain, from a base station, a first reference signal and a message indicating a quantity M of beamforming vectors needing to be reported, wherein the first reference signal is received from N dual-polarized antenna ports of the base station, and wherein M and N each are an integer greater than zero; and a processor coupled to the memory and the transceiver and configured to read the information to:

estimate downlink channel states on the N dual-polarized antenna ports based on the first reference signal obtained by the transceiver; and select m first beamforming codewords based on the downlink channel states and the quantity M of beamforming vectors needing to be reported, where m≤M, and wherein the transceiver is further configured to feed back, to the base station, the m first beamforming codewords selected by the processor and ranks of the downlink channel states.

13. The beamforming-based transmission device of claim 12, wherein the processor is configured to determine the quantity M of beamforming vectors needing to he reported as a quantity m of the selected m first beamforming codewords.

14. The beamforming-based transmission device of claim 13, wherein after the processor feeds back the m first beamforming codewords and ranks of the downlink channel states to the base station, the processor is further configured to:

calculate a channel quality indicator based on the m first beamforming codewords and the ranks of the downlink channel states; and feed back the channel quality indicator to the base station.

15. The beamforming-based transmission device of claim 14, wherein after the processor feeds hack the channel quality indicator to the base station, the processor is further configured to:

obtain, from the base station, a second reference signal; obtain data from k antenna ports of the base station:

estimate downlink channel states on the k antenna ports based on the second reference signal; and decode, through precoding, a data channel based on ranks of the downlink channel states, wherein k is a positive integer greater than zero.

16. The beamforming-based transmission device of claim 13, wherein after the processor feeds back the m first beamforming codewords and ranks of the downlink channel states to the base station, the processor is further configured to:
obtain, using the transceiver and from the base station, a second reference signal, wherein the data is received from p antenna ports of the base station;
estimate downlink channel states on the p antenna ports based on the second reference signal;
select q antenna ports from the p antenna ports based on the downlink channel states;
calculate a channel quality indicator; and
feed back sequence numbers of the q antenna ports and the channel quality indicator to the base station, wherein q≤p and p is equal to m or p is equal to 2 m.

17. The beamforming-based transmission device of claim 16, wherein after the processor feeds back sequence numbers of the q antenna ports and the channel quality indicator to the base station, the processor is further configured to:
obtain, from the base station, a third reference signal and data, wherein the data is received from k antenna ports of the base station;
estimate downlink channel states on the k antenna ports based on the third reference signal; and
decode, through precoding, a data channel based on ranks of the downlink channel states.

18. The beamforming-based transmission device of claim 17 wherein:
when a rank of a downlink channel state is one, if a quantity of the k antenna ports is an even number, the processor decodes the data channel through spatial frequency block coding (SFBC) precoding, and when the rank of the downlink channel state is not one, the processor decodes the data channel through large delay cyclic diversity precoding;
when the rank of the downlink channel state is greater than one, the processor decodes the data channel through open-loop spatial multiplexing precoding;
when the rank of the downlink channel state is one, the processor decodes the data channel through large delay cyclic diversity precoding; or
when the rank of the downlink channel state is greater than one, the processor decodes the data channel through open-loop spatial multiplexing precoding.

19. The beamforming-based transmission device of claim 12, wherein the processor is configured to determine a quantity m of the m first beamforming codewords based on the downlink channel states and the quantity M of beamforming vectors needing to he reported so that channel quality after joint preceding of m optimal beamforming vectors is optimal, and wherein the processor is further configured to feed back a value of m to the base station using the transceiver.

* * * * *

UNITED STATES PATENT AND TRADEMARK OFFICE
CERTIFICATE OF CORRECTION

PATENT NO. : 10,693,543 B2  
APPLICATION NO. : 16/338641  
DATED : June 23, 2020  
INVENTOR(S) : Yanliang Sun and Bin Liu Page 1 of 1

It is certified that error appears in the above-identified patent and that said Letters Patent is hereby corrected as shown below:

Claim 4, Column 42, Line 64: "the terminal, from the base station," should read "the terminal from the base station,"

Claim 8, Column 43, Line 50: "the base station, wherein" should read "of the base station, wherein"

Claim 8, Column 43, Line 51: "wherein; L>N;" should read "wherein L>N;"

Claim 10, Column 44, Line 10: "claim 9" should read "claim 8"

Claim 13, Column 44, Line 50: "to he reported" should read "to be reported"

Claim 13, Column 44, Line 51: "of the selected m first" should read "of the m first"

Claim 16, Column 45, Line 12: "reference signal, wherein" should read "reference signal and data, wherein"

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*